(12) United States Patent
Simonyi et al.

(10) Patent No.: US 10,721,084 B2
(45) Date of Patent: Jul. 21, 2020

(54) PROVIDING A PRIVATE MODE IN ASYNCHRONOUS COLLABORATION FOR A SYNCHRONOUS COLLABORATION ENVIRONMENT

(71) Applicant: Microsoft Technology Licensing, LLC, Redmond, WA (US)

(72) Inventors: Charles Simonyi, Medina, WA (US); Eran Megiddo, Bellevue, WA (US); Andras Nagy, Bellevue, WA (US); Alexander Elijah Pardes, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 211 days.

(21) Appl. No.: 15/838,323

(22) Filed: Dec. 11, 2017

(65) Prior Publication Data

US 2019/0097823 A1 Mar. 28, 2019

Related U.S. Application Data

(60) Provisional application No. 62/563,066, filed on Sep. 25, 2017.

(51) Int. Cl.
| *G06F 15/16* | (2006.01) |
| *H04L 12/18* | (2006.01) |
| *G06F 16/93* | (2019.01) |
| *H04L 29/06* | (2006.01) |
| *G06Q 10/10* | (2012.01) |
| *G06F 40/14* | (2020.01) |

(Continued)

(52) U.S. Cl.
CPC .......... *H04L 12/1813* (2013.01); *G06F 16/93* (2019.01); *G06F 40/14* (2020.01);
(Continued)

(58) Field of Classification Search
CPC ............ H04L 12/1813; H04L 65/1093; H04L 12/1822; G06F 16/93; G06F 17/24;
(Continued)

(56) References Cited

U.S. PATENT DOCUMENTS

| 6,760,840 B1 | 7/2004 | Shimbo et al. |
| 8,825,758 B2 | 9/2014 | Bailor et al. |
| (Continued) | | |

FOREIGN PATENT DOCUMENTS

WO 2016094868 A1 6/2016

OTHER PUBLICATIONS

"International Search Report and Written Opinion Isssued in PCT Application No. PCT/US2018/039200", dated Oct. 2, 2018, 11 Pages.

*Primary Examiner* — Liang Che A Wang
*Assistant Examiner* — Johnny B Aguiar
(74) *Attorney, Agent, or Firm* — Talem IP Law, LLP

(57) ABSTRACT

Groupware features are described that support asynchronous collaboration for a synchronous collaboration environment. During a synchronous collaboration session, a document is displayed at a user's computing device. As changes to the document are received at the user's computing device, a change list is updated and the modified document is displayed. Any changes from the user are broadcast to other participants. For asynchronous collaboration during the session, a user-specific fork is created in the change list to contain private changes for the user. For each private change from the user, the groupware updates the change list in the user-specific fork with the private change, which is not broadcast to the other participants for reconciliation.

15 Claims, 37 Drawing Sheets

(51) Int. Cl.
  *G06F 40/166* (2020.01)
  *G06F 40/169* (2020.01)
  *G06F 40/197* (2020.01)

(52) U.S. Cl.
  CPC .......... *G06F 40/166* (2020.01); *G06F 40/169* (2020.01); *G06F 40/197* (2020.01); *G06Q 10/103* (2013.01); *H04L 12/1822* (2013.01); *H04L 65/1093* (2013.01)

(58) Field of Classification Search
  CPC ............ G06F 17/2288; G06F 17/2247; G06F 17/241; G06F 40/197; G06F 40/169; G06F 40/166; G06F 40/14; G06Q 10/103
  USPC .......................... 709/204, 205; 715/751, 753
  See application file for complete search history.

(56) References Cited

U.S. PATENT DOCUMENTS

| | | | |
|---|---|---|---|
| 8,943,417 B2 | 1/2015 | Parker et al. | |
| 2004/0153504 A1* | 8/2004 | Hutchinson | G06Q 10/10 709/204 |
| 2006/0026502 A1* | 2/2006 | Dutta | G06Q 10/10 715/230 |
| 2006/0136441 A1* | 6/2006 | Fujisaki | G06Q 10/10 |
| 2008/0046828 A1* | 2/2008 | Bibliowicz | G06Q 10/10 715/751 |
| 2010/0257457 A1 | 10/2010 | De Goes | |
| 2012/0030563 A1* | 2/2012 | Lemonik | G06F 17/248 715/255 |
| 2013/0212485 A1* | 8/2013 | Yankovich | G06F 9/4451 715/741 |
| 2014/0281872 A1 | 9/2014 | Glover | |
| 2014/0373108 A1* | 12/2014 | Bailor | G06F 17/24 726/4 |
| 2015/0269033 A1* | 9/2015 | Bailor | G06F 17/24 707/608 |
| 2015/0363378 A1 | 12/2015 | Dolph et al. | |
| 2016/0048486 A1 | 2/2016 | Lopategui | |
| 2016/0196247 A1 | 7/2016 | Lee et al. | |
| 2016/0283456 A1 | 9/2016 | Sitrick et al. | |
| 2017/0149906 A1 | 5/2017 | DeMaris et al. | |
| 2017/0262490 A1 | 9/2017 | Tholfsen et al. | |

\* cited by examiner

AB

00:01, Tips..., ab
00:03, 1), we
00:04, Identify..., we
00:05, 2), we
00:06, Prepare..., we
00:07, 3), we
00:08, If you..., we
00:09, 4), we
00:10, Prepare..., we

WE

00:01, Tips..., ab
00:03, 1), we
00:04, Identify..., we
00:05, 2), we
00:06, Prepare..., we
00:07, 3), we
00:08, If you..., we
00:09, 4), we
00:10, Prepare..., we

CD

00:01, Tips..., ab
00:03, 1), we
00:04, Identify..., we
00:05, 2), we
00:06, Prepare..., we
00:07, 3), we
00:08, If you..., we
00:09, 4), we
00:10, Prepare..., we

00:01, Tips..., ab
00:03, 1), we
00:04, Identify..., we
00:05, 2), we
00:06, Prepare..., we
00:07, 3), we
00:08, If you..., we
00:09, 4), we
00:10, Prepare..., we
0.11, * important..., cd
0.12, * cash, cd
0.13, * first..., cd

WE

00:01, Tips..., ab
00:03, 1), we
00:04, Identify..., we
00:05, 2), we
00:06, Prepare..., we
00:07, 3), we
00:08, If you..., we
00:09, 4), we
00:10, Prepare..., we
0.11, * important..., cd
0.12, * cash, cd
0.13, * first..., cd

CD

00:01, Tips..., ab
00:03, 1), we
00:04, Identify..., we
00:05, 2), we
00:06, Prepare..., we
00:07, 3), we
00:08, If you..., we
00:09, 4), we
00:10, Prepare..., we
0.11, * important..., cd
0.12, * cash, cd
0.13, * first..., cd

FIG. 6C

| AB | WE | CD |
|---|---|---|
| 00:01, Tips..., ab | 00:01, Tips..., ab | 00:01, Tips..., ab |
| 00:03, 1), we | 00:03, 1), we | 00:03, 1), we |
| 00:04, Identify..., we | 00:04, Identify..., we | 00:04, Identify..., we |
| 00:05, 2), we | 00:05, 2), we | 00:05, 2), we |
| 00:06, Prepare..., we | 00:06, Prepare..., we | 00:06, Prepare..., we |
| 00:07, 3), we | 00:07, 3), we | 00:07, 3), we |
| 00:08, If you..., we | 00:08, If you..., we | 00:08, If you..., we |
| 00:09, 4), we | 00:09, 4), we | 00:09, 4), we |
| 00:10, Prepare..., we | 00:10, Prepare..., we | 00:10, Prepare..., we |
| 0.11, * important..., cd | 0.11, * important..., cd | 0.11, * important..., cd |
| 0.12, * cash, cd | 0.12, * cash, cd | 0.12, * cash, cd |
| 0.13, * first..., cd | 0.13, * first..., cd | 0.13, * first..., cd |
| 0.14, * medications, we | 0.14, * medications, we | 0.14, * medications, we |
| 0.15, * flashlights, we | 0.15, * flashlights, we | 0.15, * flashlights, we |
| 0.16, * batteries..., we | 0.16, * batteries..., we | 0.16, * batteries..., we |
| 0.17, * chargers, we | 0.17, * chargers, we | 0.17, * chargers, we |

FIG. 7C

| AB | WE | CD |
|---|---|---|
| 00:01, Tips..., ab | 00:01, Tips..., ab | 00:01, Tips..., ab |
| 00:03, 1), we | 00:03, 1), we | 00:03, 1), we |
| 00:04, Identify..., we | 00:04, Identify..., we | 00:04, Identify..., we |
| 00:05, 2), we | 00:05, 2), we | 00:05, 2), we |
| 00:06, Prepare..., we | 00:06, Prepare..., we | 00:06, Prepare..., we |
| 00:07, 3), we | 00:07, 3), we | 00:07, 3), we |
| 00:08, If you..., we | 00:08, If you..., we | 00:08, If you..., we |
| 00:09, 4), we | 00:09, 4), we | 00:09, 4), we |
| 00:10, Prepare..., we | 00:10, Prepare..., we | 00:10, Prepare..., we |
| 0.11, * important..., cd | 0.11, * important..., cd | 0.11, * important..., cd |
| 0.12, * cash, cd | 0.12, * cash, cd | 0.12, * cash, cd |
| 0.13, * first..., cd | 0.13, * first..., cd | 0.13, * first..., cd |
| 0.14, * medications, we | 0.14, * medications, we | 0.14, * medications, we |
| 0.15, * flashlights, we | 0.15, * flashlights, we | 0.15, * flashlights, we |
| 0.16, * batteries..., we | 0.16, * batteries..., we | 0.16, * batteries..., we |
| 0.17, * chargers, we | 0.17, * chargers, we | 0.17, * chargers, we |
| 0.20, image, cd | 0.20, image, cd | 0.20, image, cd |

00:01, Tips..., ab
00:03, 1), we
00:04, Identify..., we
00:05, 2), we
00:06, Prepare..., we
00:07, 3), we
00:08, If you..., we
00:09, 4), we
00:10, Prepare..., we
00:11, *important..., cd
00:12, *cash, cd
00:13, *first..., cd
00:14, *medications, we
00:15, *flashlights, we
00:16, *batteries..., we
00:17, *chargers, we
00:20, image, cd
0.27, 5), we
0.28, Charge..., we
0.30, 5), ab
0.30, Get..., ab
0.32, 6), ab Private Mode
0.26, Note..., ab
0.27, 5), ab
.28, Get..., ab

WE

00:01, Tips..., ab
00:03, 1), we
00:04, Identify..., we
00:05, 2), we
00:06, Prepare..., we
00:07, 3), we
00:08, If you..., we
00:09, 4), we
00:10, Prepare..., we
00:11, *important..., cd
00:12, *cash, cd
00:13, *first..., cd
00:14, *medications, we
00:15, *flashlights, we
00:16, *batteries..., we
00:17, *chargers, we
0.20, image, cd
0.27, 5), we
0.28, Charge..., we
0.30, 5), ab
0.30, Get..., ab
0.32, 6), ab

CD

00:01, Tips..., ab
00:03, 1), we
00:04, Identify..., we
00:05, 2), we
00:06, Prepare..., we
00:07, 3), we
00:08, If you..., we
00:09, 4), we
00:10, Prepare..., we
0.11, *important..., cd
0.12, *cash, cd
0.13, *first..., cd
0.14, *medications, we
0.15, *flashlights, we
0.16, *batteries..., we
0.17, *chargers, we
0.20, image, cd
0.27, 5), we
0.28, Charge..., we
0.30, 5), ab
0.30, Get..., ab
0.32, 6), ab

Tips to prepare for a Hurricane:

1) Identify evacuation routes and where you can stay.

2) Prepare a go-bag with items including:
* important documents (e.g., identification papers, insurance documents and phone numbers, etc.),
* cash,
* first aid supplies,
* medications,
* flashlights,
* batteries, and
* chargers.

3) If you do not plan to evacuate, stock up on supplies in case of no power and water for three days.

4) Prepare your home to reduce likelihood of injury to person and damage to structures by keeping trees trimmed and clearing debris from around the home. Tie down items or bring inside.

5) Get a weather radio.

6) Charge all devices, including cell phones.

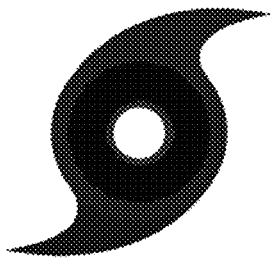

Note to self: bring in the patio furniture

Tips to prepare for a Hurricane:

1) Identify evacuation routes and where you can stay.
2) Prepare a go-bag with items including:
   * important documents (e.g., identification papers, insurance documents and phone numbers, etc.),
   * cash,
   * first aid supplies,
   * medications,
   * flashlights,
   * batteries, and
   * chargers.

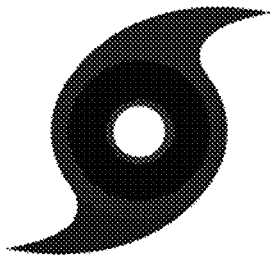

3) If you do not plan to evacuate, stock up on supplies in case of no power and water for at least three days.
4) Prepare your home to reduce likelihood of injury to person and damage to structures by keeping trees trimmed and clearing debris from around the home. Tie down items or bring inside.
5) Get a weather radio.
6) Charge all devices, including cell phones.

00:01, Tips..., ab
00:03, 1), we
00:04, Identify..., we
00:05, 2), we
00:06, Prepare..., we
00:07, 3), we
00:08, If you..., we
00:09, 4), we
00:10, Prepare..., we
0.11, *important..., cd
0.12, *cash, cd
0.13, *first..., cd
0.14, *medications, we
0.15, *flashlights, we
0.16, *batteries..., we
0.17, *chargers, we
0.20, image, cd
0.27, 5), we
0.28, Charge..., we
0.30, 5), ab
0.30, Get..., ab
0.32, 6), ab
0.35, Note..., ab Private Mode
0.26, Note..., ab
0.27, 5), ab
.28, Get..., ab

WE

00:01, Tips..., ab
00:03, 1), we
00:04, Identify..., we
00:05, 2), we
00:06, Prepare..., we
00:07, 3), we
00:08, If you..., we
00:09, 4), we
00:10, Prepare..., we
0.11, *important..., cd
0.12, *cash, cd
0.13, *first..., cd
0.14, *medications, we
0.15, *flashlights, we
0.16, *batteries..., we
0.17, *chargers, we
0.20, image, cd
0.27, 5), we
0.28, Charge..., we
0.30, 5), ab
0.30, Get..., ab
0.32, 6), ab
0.35, Note..., ab

CD

00:01, Tips..., ab
00:03, 1), we
00:04, Identify..., we
00:05, 2), we
00:06, Prepare..., we
00:07, 3), we
00:08, If you..., we
00:09, 4), we
00:10, Prepare..., we
0.11, *important..., cd
0.12, *cash, cd
0.13, *first..., cd
0.14, *medications, we
0.15, *flashlights, we
0.16, *batteries..., we
0.17, *chargers, we
0.20, image, cd
0.27, 5), we
0.28, Charge..., we
0.30, 5), ab
0.30, Get..., ab
0.32, 6), ab

FIG. 11E

PROVIDING A PRIVATE MODE IN ASYNCHRONOUS COLLABORATION FOR A SYNCHRONOUS COLLABORATION ENVIRONMENT

CROSS-REFERENCE TO RELATED APPLICATION

This application claims the benefit of U.S. Provisional Application No. 62/563,066, which was filed Sep. 25, 2017.

BACKGROUND

Collaboration with respect to an electronic document can be performed in a variety of scenarios via any number of collaborative software applications. Collaborative software applications, or "groupware", enable multiple users to perform a common task. The term groupware refers to a set of features of a software platform that assist multiple persons—or for that matter a single person—working in a coordinated fashion on a task. Often, version control, reversible editing, and attribution are provided. The software can have functionality including content creation and editing, annotation, voice, video, chat, and combinations thereof.

Collaboration scenarios may be categorized into one of two modes defined by time—synchronous and asynchronous. Synchronous scenarios entail a real-time environment, where collaboration can appear to be simultaneous. Asynchronous scenarios may be carried out offline, in series or in parallel, and/or among participants that work on their own versions of a file that are then merged.

BRIEF SUMMARY

Groupware features are described that support asynchronous collaboration for a synchronous collaboration environment. In a synchronous collaboration environment, multiple users collaborate in real-time to accomplish a task. For example, two or more users may work in a coordinated fashion on an "interactive document".

During a synchronous collaboration session, a document can be displayed at a collaborator user's computing device. The document can be stored with a change list and has a current state of content represented by a current state tree. Generally, for synchronous collaboration, as changes to the document are received at the computing device from a user at the computing device, the groupware updates the change list with the first change, broadcasts the first change to synchronize a state of the document displayed at other computing devices, and displays the document with the first change at the computing device. Similarly, as changes to the document made from another computing device are received at the computing device, the groupware updates the change list with the changes from the other computing device and displays the document with the changes from the other computer device.

For asynchronous collaboration during the synchronous collaboration session, when an indication to make a private change is received at the computing device, the groupware at the computing device creates a user-specific fork (or version) in the change list to contain private changes for the user. The creating of the user-specific fork can include creating a private version of the change list. Thus, for each private change from the user at the computing device, the groupware updates the change list with the private change, stores the change in the version of the document created for this purpose, and suppresses the broadcasting of the private change from that user-specific fork. The suppression of the broadcasting of the private change can be active or passive. The synchronous collaboration with the public version would be continued into the private version, but not the other way around.

Advantageously, the forking in the tree can be made at the level of an entity unit within the document using the common copy operation. This granularity in limiting the scope of the forking and the possible subsequent reconciliation is a very useful feature for the users who might be sharing parts of their documents as it is commonly done in organizations yet retain the option of editing the "copies" and later reconcile the different edits to the different "copies" with each other.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIGS. 4A-4C, 5A-5C, 6A-6C, 7A-7C, 8A-8C, 9A-9E, 10A-10E, and 11A-11E illustrate a collaboration scenario including asynchronous collaboration in a synchronous collaboration environment.

DETAILED DESCRIPTION

Groupware features are described that support asynchronous collaboration for a synchronous collaboration environment. An "Interactive Document" refers to electronic media content that has a current state and that is represented by a change list. The current state is represented in a tree format. The change list is the primary representation of the interactive document and maintains a strict chronological order. The interactive document can be shared and synchronized among one or more users using the described groupware features.

Interactive Documents can be used for real-time sharing of information among multiple machines. The multiple machines may be operated on behalf of a single user or the multiple machines may be operated on behalf of multiple corresponding people. For a collaboration session involving an interactive document, the user(s) may be identified or anonymous. In addition, access to, and participation in, the collaboration session may involve identification, authentication and/or authorization mechanisms.

Figure 1A:
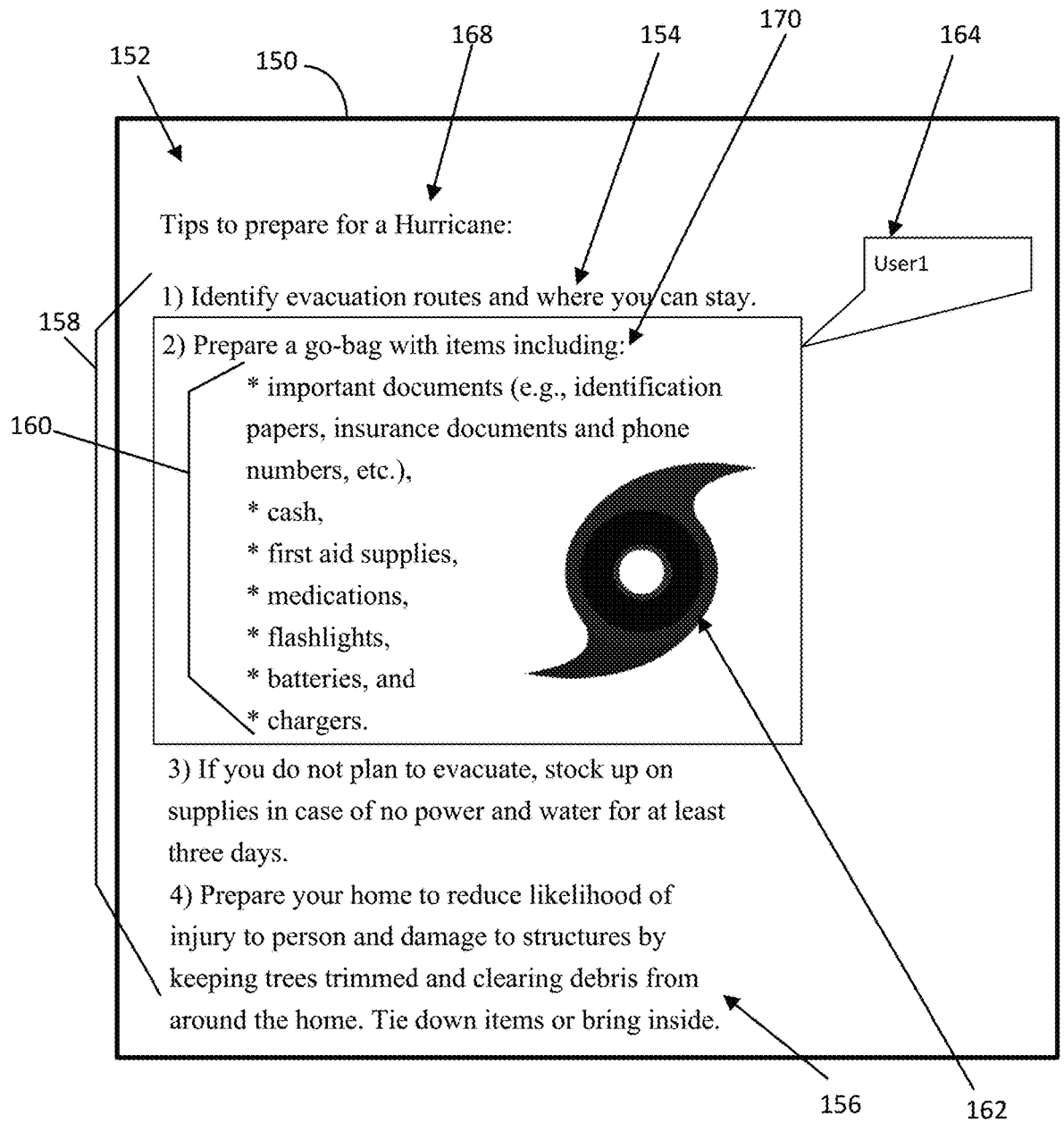
FIG. 1A illustrates displayed content of an example interactive document.
Figure 1B:
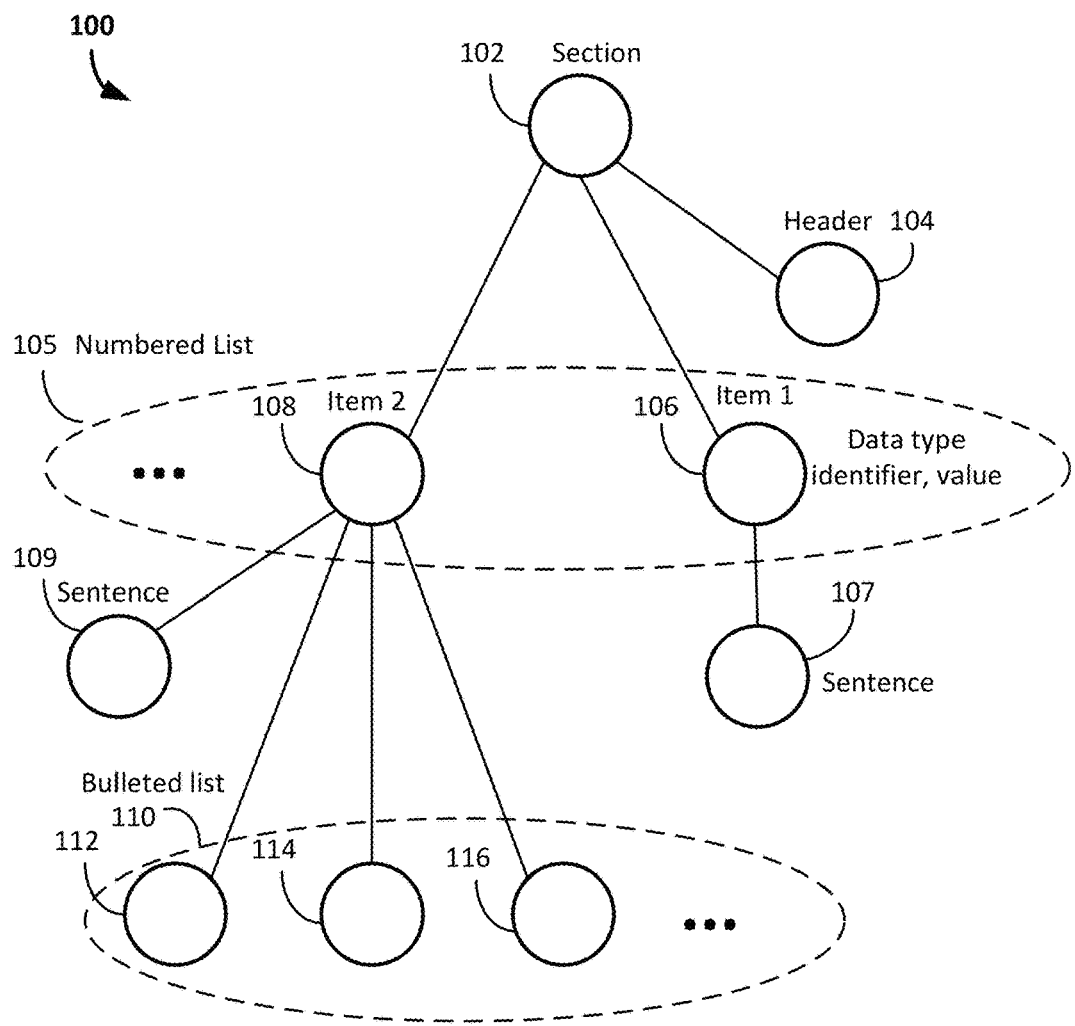
FIG. 1B illustrates a portion of an example interactive document current state tree for the example interactive document.
Figure 1C:
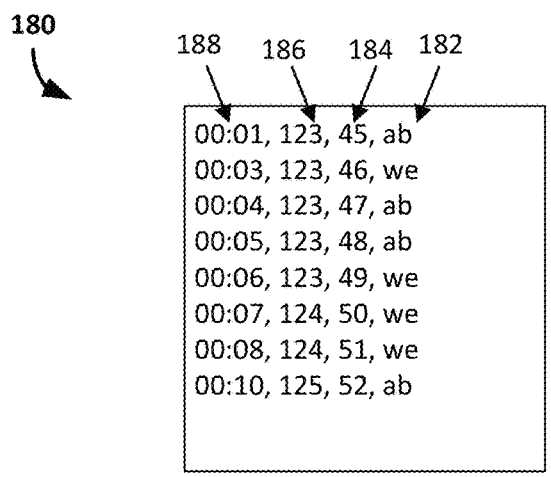
FIG. 1C illustrates an example change list representation of the example interactive document.

FIG. 1A illustrates displayed content of an example interactive document; FIG. 1B illustrates a portion of an example interactive document current state tree for the example interactive document; and FIG. 1C illustrates an example change list representation of the example interactive document. An interactive document can be formed of any number of entities. An "entity" refers to an entire integral unit of a noun or thing understood by a user (and which can be acted upon, e.g., deleted). For example, as illustrated in FIG. 1A, document 150 can include entities of section 152, sentence 154, paragraph 156, numbered list 158, bulleted list 160, image 162, and comment 164. Of course, entities are not limited thereto. Entities can have different data types since different data types can co-exist in the document. "Data types" refer to the type of content. Examples of data types include, but are not limited to, numbers, text, pictures, ink, color, and time.

A tree representation, such as representation 100 of FIG. 1A, of an interactive document, such as document 150, can include nodes representing the entities in the document.

In a current state tree, the nodes can include one or more crown nodes and one or more organizer nodes. An "organizer node" refers to a node from which other nodes branch from. A "crown node" refers to the topmost organizer node of an Entity. The identification of the entity is given by the "isa", or label, of the entity's crown node. An "offspring entity" refers to the entities composing the Entity; some offspring entities may not be independent units. A "trait" refers to the label, which may be an identifier, for a group of offspring entities. "Parameters" refer to offspring that do not have further nodes below and whose data types are determined by their traits.

"Payload" refers to a special parameter for every node that has a data type identification and a value. A special payload type points to another node in the same tree and can be used to represent graphs, or any form of sharing, for example variables in an expression. This identification and value can be created and accessed via a special application programming interface (API).

Referring to FIG. 1B, the illustrative portion of the interactive document current state tree shows a crown node 102 and its offspring nodes, which can include organizer nodes. For the page shown in FIG. 1A, its current state tree includes node 102 for the displayed section 152 of the document, an offspring node 104 for the header 168 and nodes sharing a common trait 105 of being part of a numbered list 158. Two of the four items of the numbered list 158 are shown in the figure. In particular, the first item is represented by node 106 and includes sentence 154, which may be represented by node 107. The second item is represented by node 108 and includes the sentence statement 170, which may be represented by node 109 and the bulleted list 160 represented by nodes sharing same trait 110 of being bullets (three of the seven bullets are shown and represented by nodes 112, 114, 116).

Since interactive documents may be the only objects internal to the system that have a state, the state information can be conveniently encapsulated in the interactive document for protection, sharing, remoting, resetting, inspecting, and the like. As mentioned above, interactive documents have a current state in a tree format. The tree representation of the interactive document can be used to represent a wide variety of user experiences. In some cases, the state of an interactive document can be changed using APIs.

Most interactive documents can maintain a change list that store the details of the change. The change list is used by the groupware features in performing operations. The change list can be the primary representation of the interactive document. The change list itself is changed (e.g., appended to) by user actions: editing operations typically add a single or a few changes, while groupware reconciliation may add a larger number of changes to take into account the changes made during synchronous or asynchronous collaboration. Editing operations and reconciliation can be carried out for both synchronous and asynchronous collaboration modes.

As shown in FIG. 1C, the interactive document 150 can be represented by a list 180 of each change made in the document. Information provided by the change list 180 can include, but is not limited to, the user or client making the change to the document (182); the entity being created, deleted or modified (186); the content of the entity (184); and the time the change is made (188). Other information can include the action taken on the entity/content, traits, and other parameters.

On the change lists and in the backing store (e.g., a backup storage or "master list"), the identities (isas, traits) and pointers can be represented using unique numbers. When accessed through the main memory these become efficient implementation pointers. That is, isa and traits are effective pointers to definition nodes. Further, the yet unaccessed parts of the tree in main memory can be represented by the continuations (where the argument/value is to be passed).

Filtered external data can be represented as temporary interactive documents. In these temporary interactive documents, the change lists can contain the particular data requests to the external source.

Undo and Redo

Groupware features include the ability to efficiently present the state of a tree given an arbitrary change list. In typical operation, the "present" state, which is the state corresponding to the end of the change list is the state of interest. However, there are times when earlier states of the change list are desirable, for example, to create an illusion of "time travel" in the document for a user. Another reason to look at earlier state is during synchronous collaboration when an action "in the past" is received. This can happen if the transmission times (or the clock errors) are such that the time stamp of the action precedes the time stamp of the action at the end of the change list. In this situation, the state of the document is positioned at the correct time in the change list, the action is executed on the state and inserted into the change list, and then document state is repositioned to where it was before the intercession.

The undo and redo operations may be encoded as follows: Any action other than undo and redo can be undone. An undo action can be redone. If the redo action needs to be reversed, the original action can be undone again, and so on.

As can be seen from the above description of undo and redo operations, the described groupware features can include the ability to undo past actions. The undo operation is implemented as a current operation in the change list since, in actuality, one cannot change the past. In addition, when something is undone, it may have an effect on the subsequent operations that came after. These two issues do not generally arise with more traditional undo functions since most applications only apply an "undo" command with the last thing performed. Here, these two issues are addressed by defining an undo of an action as a new action that points to the action to be undone. For example, the change list representing a document can be updated with a current entry (and action) that points to a past entry (corresponding to the operation to be undone) in the change list. Similarly redo points to the undo action to be redone. For example, a change list can include a redo action entry that points to an undo action entry that is to be redone.

In addition to undo and redo, the system also implements a revert action that recreates a state at some point in the past. One way to create a revert operation is to time-travel to a past state and issue a revert command. A revert can be also undone by reverting to the point just before it. While looking at past states, the only user actions that are allowed are revert and copy, since they do not attempt to change the "past".

The following provides a description of how a document state can be computed incrementally from a current state. Performing a method that incrementally creates the tree representing the current state of the document can be more efficient than performing a method that defines the desired result (e.g., the state of the tree from the change list) and creates the tree from scratch.

Definitions

A document state is a triplet $\{T, L, P\}$ where T is an initial tree, L is a change list, and P is a place in the change list.

Each change has an apply and a rollback operation which can be applied to a tree. The apply operation may be attempted on any tree and can succeed or fail. The rollback operation must be performed on a tree which was the direct result of a successful apply operation of the same change. The operations for undo, redo, and revert do nothing when applied. They achieve their ends by modifying internal data structures as the algorithm unfolds. The undo operations have pointers to the changes that are to be undone. The redo operation points to the undo that it redoes. A revert contains a place in the change list, and by that it effectively targets all changes in the range between itself and that place.

Change A is said to inactivate change B if:
A is an undo and B is in the set of targets of A;
A is a redo and B is the undo A targets; and
A is a revert and B is in the range A targets.

A change is defined to be "live" with respect to a document state if it precedes the rewind position, that being the position P in the document state given.

A change is defined to be "active" with respect to a document state if it is live and is not inactivated by an active change. (This definition is consistent because there can be no cycles in the inactivation graph.)

A change is defined to be "successful" with respect to a document state if it is active and can be successfully applied to the tree which is the result of applying all preceding active changes to $T_{init}$.

The content of a document with document state $\{T_{init}, L, P\}$ is defined to be the tree $T_{content}$, computed as follows:
Set $T_{content}$ to $T_{init}$
For each change, C, in the ordered set of changes that are active with respect to the document state
Apply C to $T_{content}$
The rewind algorithm takes as input:
$D_1 := \{T_{init}, L, P_1\}$, a document state
$T_1$, the content of $D_1$
$S_1$, the set of successful changes with respect to $D_1$
$P_2$, the desired rewind position
The rewind algorithm produces:
$T_2$, the content tree for $D_2$ where $D_2 := \{T_{init}, L, P_2\}$,
$S_2$, the set of successful changes with respect to $D_2$.

These results are available to be displayed for the user, and they can be also the inputs to the next call of the algorithm.

The rewind algorithm can be as follows:
If $P_1$ equals $P_2$ there is nothing to do.
Set T to $T_1$ (we mutate the input tree which is initially equal to $T_1$)
Set S to $S_1$ (we mutate the input set which is initially equal to $S_1$)
Set $C_{cur}$ to the last change in the range bounded by $P_1$ and $P_2$
Set $P_{lim}$ to the earlier of $P_1$ and $P_2$
Set U to an empty set of changes
Set R to an empty range of changes
Note that R is just an adjunct to U of changes that are targeted using ranges for efficiency, that is they are targeted by reverts, as opposed to U which are changes targeted by undos and redos.

Note also that the set S can be represented in a number of different ways that are equivalent in effect. For example, S can be thought of as a temporary addition to $S_1$ of the information whether the changes are active, whether they are successful, and also with information of why a change was not successful as returned by the application of the change. The additional information may be useful for the user and could not be stored in S.

While $C_{cur}$ is after $P_{lim}$:
  If $C_{cur}$ is successful with respect to $D_1$ (namely if $C_{cur}$ is contained in $S_1$):
    Now $C_{cur}$ is before $P_1$
    Rollback $C_{cur}$ from T
    Remove $C_{cur}$ from S
  If $C_{cur}$ is live with respect to $D_2$:
    If $C_{cur}$ is not in R or U:
      Add $C_{cur}$ to S
    If $C_{cur}$ is an undo or redo:
      Add the set of targets from $C_{cur}$ to U
    If $C_{cur}$ is a revert:
      Set R to the range of $C_{cur}$
  If [$C_{cur}$ is a revert or undo or redo] and [$C_{cur}$ is in $S_1$ and is not in S or vice versa]:
    Calculate $P_{first}$ as the place before the first change in the set of targets of $C_{cur}$
    (or the first change in the range of targets if $C_{cur}$ is a revert)
    If $P_{first}$ is earlier than $P_{lim}$
      Set $P_{lim}$ to $P_{first}$
  Set $C_{cur}$ to the change before $C_{cur}$
At this point S is the set of active changes with respect to $D_2$.
While $C_{cur}$ is before $P_2$:
  If $C_{cur}$ is in S:
    Apply $C_{cur}$ to T
    If the apply is not successful:
      Remove $C_{cur}$ from S
  Set $C_{cur}$ to the change after $C_{cur}$
Now T is equal to $T_2$.

Copies, Versions, Branches, and Merges

A copyset represents the copy operations for a document. In particular, a copyset refers to the set of related copies among which there is a potential for reconciliation; it is derived from the change lists. The copy action can be made to the whole document or to some of the content in the document, tracking the copying at a level of granularity that can include a single branch of the interactive document tree (representing the current state of that document at the time of the copy).

Document level copies may be identified with name of document, URL, or name/version, time, user. Content level copies may be identified with time, user, and location in the tree among the other content in the document. Each copy identifies to the change list of both its source and its destination. Reconciliations/merging (in either or both directions) form a graph structure overlayed on the copy tree.

Figure 2:
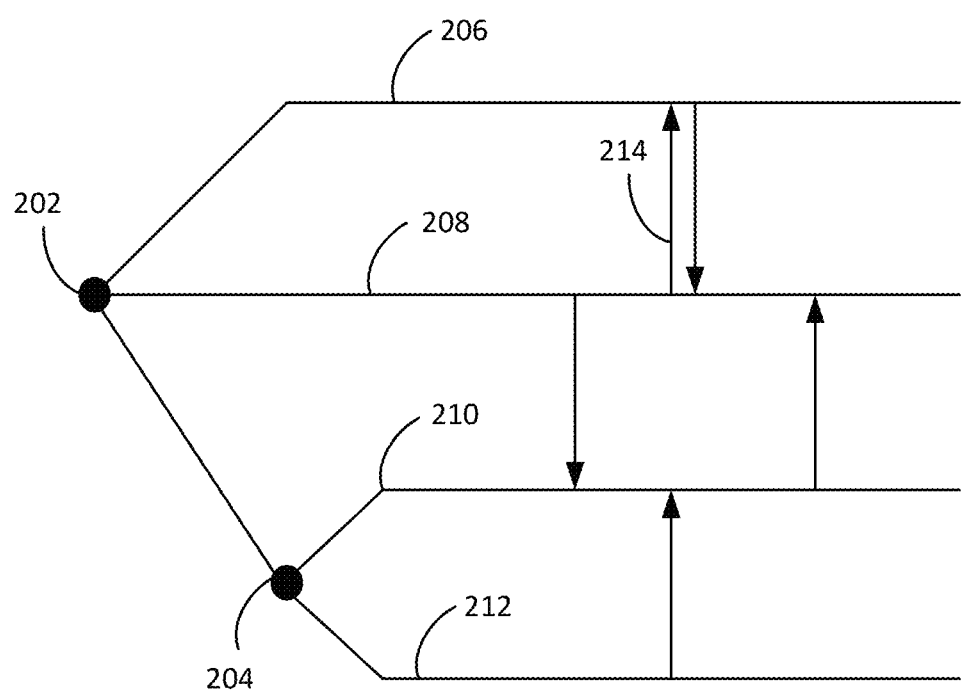
FIG. 2 illustrates a graphical representation of an example copyset view.

FIG. 2 illustrates a graphical representation of an example copyset view. A copyset view is a visual picture of the copy tree, with a representation of the history list following the copies, with the reconciliation points highlighted and connected. At a glance, the view shows the reconciliation histories of all the copies.

Referring to FIG. 2, the two dots 202, 204 represent copy operations, and the four horizontal lines 206, 208, 210, 212 each represent the separate copies. Each copy operation can be displayed with the circumstances of the particular copy: the places and the times. The horizontal lines symbolize the changes made to the copy. An arrow 214 represents a reconciliation point (e.g., occurrence in time). The line segments between the arrows 214 may be labelled with the number of changes or a representation of the changes themselves. The copy lines will "extend" when edits are made to them. If a copy is deleted, the line will be terminated; however, if the deletion is undone, the extension can continue.

In the example drawing, the first of the copy operations went three ways: this is just an abbreviation for two immediately following copies, without any history between them. Note that the "from" end of a reconciliation can be in a read-only document, in which case the relationship will be recorded only in the "to" document.

Asynchronous Collaboration and Synchronous Collaboration

Synchronous collaboration, or "real-time" sharing may also be referred to herein as FM Groupware, which include the features supporting the synchronous collaboration.

In addition to the real-time sharing, the described features include the ability to limit the real time sharing for any given entity so that private notes may be mixed with shared information, the ability to work off-line and then share, or to recover from lost connectivity, the ability to look at the document with the exclusion or inclusion of changes on the basis of the provenance of the data—for example to highlight one of the participant's changes, the ability to represent merge conflicts in a way that the resolution of a conflict can be delayed indefinitely and the conflict decision can be changed at any time, the ability to represent ambiguous situations (for example when a graph is copied in several parts, copies of the latter part may point to the new copy of the earlier part or they may point to the original) as conflicts so that alternative outcomes can be reached, or a combination thereof.

Users see a view of the document that enables them to interact with it. The history of these interactions, when stored, is a constructive representation of the document, one that retains the provenance of all data and allows full versioning and reconciliation of versions, where every "copy" operation creates the potential version. This potential is fully realized when some of the copies are themselves changed. The term copy, as used here, incorporates the duplication or distribution of documents as well as any parts of documents to any level as in copies of other copies. The branching of the copy tree when a copy occurs is referred to herein as a fork.

The term reconciliation incorporates all merges and updates between two or more versions (e.g., changed copies), in any direction or combination. This means that the user can elect for each version whether they contribute changes, accept changes or both. After the reconciliation, all the versions (the copies) that participated in the reconciliation as accepting changes, will be again the same, which was the purpose of reconciliation. The copies that made only contributions will remain unchanged.

Reconciliation is a process that is applied to two or more copies of the same data. These copies may be in the same document (e.g., when a user has some private changes during a synchronous collaboration session) or they may be in different documents. In the full general picture, any of the copies involved may be a source of changes, or the destination of changes, or both. After reconciliation, the offered changes will have been distributed to those that accept them.

Reconciliation is automatic under FM protocol (synchronous collaboration). Reconciliation is performed in response to a request by the user under the AM protocol (asynchronous collaboration). Reconciliation conflicts may be treated differently under the AM and FM protocols as well. For example, in a case where a conflict arises because a word W is replaced by A in one copy, and the same word is replaced by B in the other, the reconciliation of the conflict can follow a similar pattern as the other types of reconciliation. In FM, the conflict can be arbitrarily resolved to one plausible outcome, since continuing of the real time work is of the essence. In AM, a representation of the conflict can be recorded and brought to the attention of the user. Of course, implementations are not limited thereto; FM protocol reconciliation could include resolutions made in response to a user selection and AM protocol reconciliation may include automatic reconciliation (for example, based on pre-selected or predefined criteria).

Mute Feature—Personal Notes in Shared Document

Mute means that the changes on the muted machine will not be shared with the other FM participants. Muting is part of the data's provenance and it can be turned on or off for the whole document or just a specific change with an appropriate user interface as the user experience requires. The mute feature can be considered part of the collaboration features and is also referred to herein as private mode.

The muted notes are in effect changes to private copy of the FM copy such that the private copy receives FM changes but does not broadcast the changes made to it. This means that private notes of several participants to a shared FM session could be merged, at their option and at a time of their choosing, by AM reconciling their private copies.

Figure 3A:
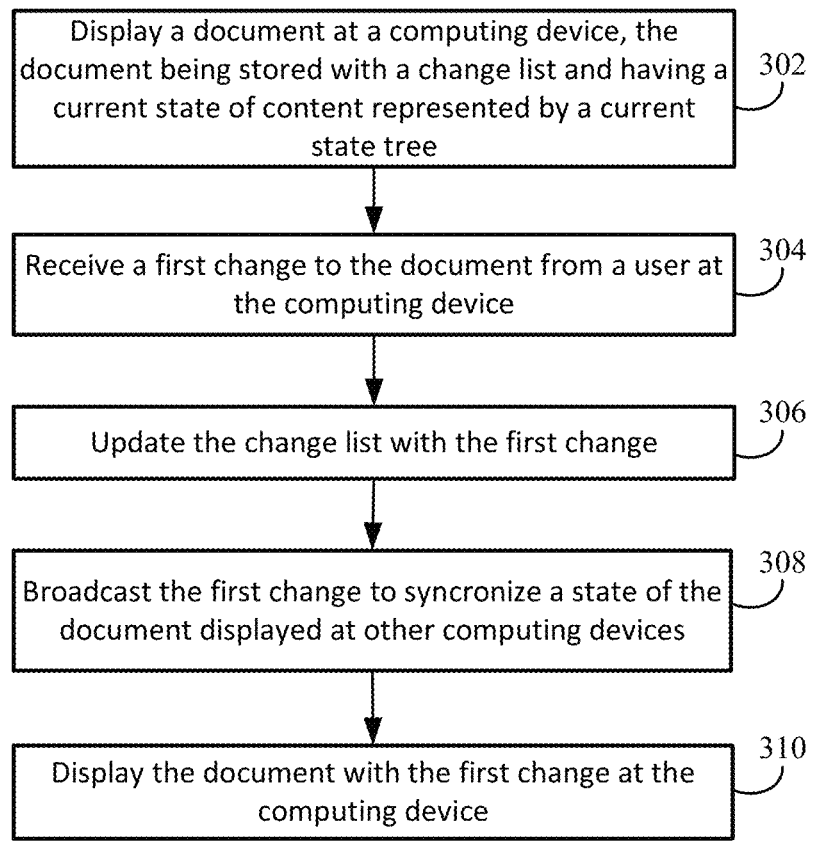
FIGS. 3A-3C illustrate example processes supported by the described groupware features.
Figure 3B:
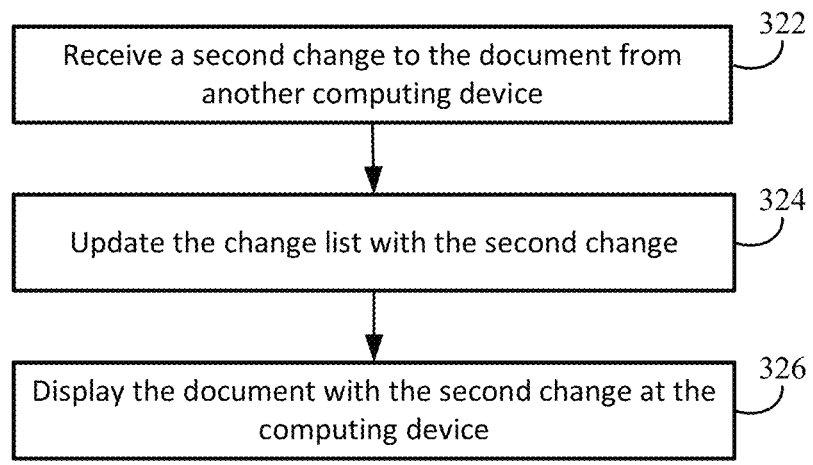
Figure 3C:
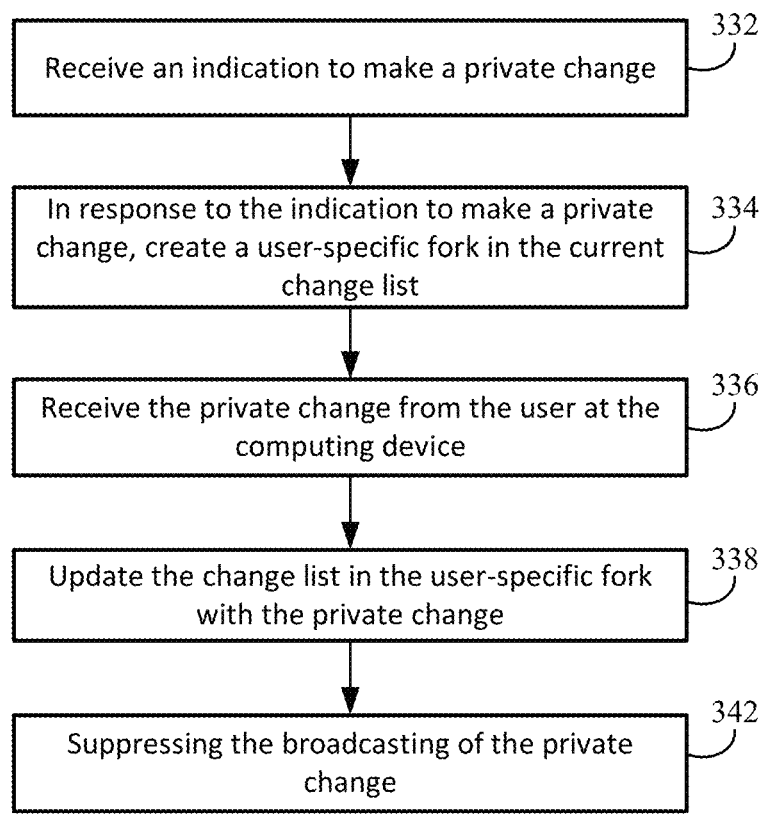

FIGS. 3A-3C illustrate example processes supported by the described groupware features. Referring to FIGS. 3A and 3B, synchronous collaboration processes carried out at a user computing device can include displaying (302) a document at a computing device, the document being stored with a change list and having a current state of content represented by a current state tree; receiving (304), at the computing device, a first change to the document from a user at the computing device; updating (306) the change list with the first change, broadcasting (308) the first change to synchronize a state of the document displayed at other computing devices, and displaying (310) the document with the first change at the computing device. The updating (306), broadcasting (308) and displaying (310) may be performed via parallel processes or serially in any order. The information included in the broadcasting of a change from a computing device can include source information including, but not limited to, a user identifier, a time, and a location of the change with respect to other content in the document.

Similarly, the synchronous collaboration processes can include receiving (322), at the computing device, a second change to the document from another computing device; updating (324) the change list with the second change, and displaying (326) the document with the second change at the computing device. The information included with changes received from other computing devices can include source information including, but not limited to, a user identifier, a time, and a location of the change with respect to other content in the document.

The groupware features support the asynchronous collaboration that include processes such as shown in FIG. 3C. For example, the asynchronous collaboration feature can include receiving (332), at the computing device, an indication to make a private change; and, in response to the indication to make the private change, creating (334) a user-specific fork in the current change list to contain private changes for the user. The creating (334) of the user-specific fork can include creating a private version of the change list. The private version of the change list may be a copy of all or a portion of the change list at the user's computing device. For example, the user-specific fork can represent a version of the entire document or a subset of the document. In many cases, the user-specific fork is at the level of an entity unit within the document. For the user-specific fork that represents a subset of the document (where the subset is less than the entire document), the user-specific fork can include a copy of one or more entity units from the document. That is, the private version of the change list can contain a copy of changes to a particular entity unit within the document and not the entire change list.

Then, after creating (334) the user-specific fork and receiving (336), at the computing device, the private change from the user at the computing device, the processes for the asynchronous collaboration feature can include updating (338) the change list in the user-specific fork with the private change and suppressing (342) the broadcasting of the private change from that user-specific fork. The suppressing (342) of the broadcasting is a function of the mute feature and, while turned on, can prevent the broadcasting of the private changes. The suppression of the broadcasting of the private change can be active or passive. An active suppression of the broadcasting can entail the system identifying that a change is a private change and preventing the change from being broadcast. A passive suppression of the broadcasting refers to the case where the default action is to not broadcast a change and that the system has to actively determine whether to broadcast a change at a time the change is offered for AM or FM reconciliation, which in the case of the general FM mode, would be occurring automatically and with an appearance of real-time interaction to the user.

In some cases, the current state of the document created for the private mode can be represented by a current state tree with a forked node representing the private copy, which can be a copy of content from an existing node or a new node representing content that is private for the user. Even while the user is in private, or mute, mode, the user can continue to receive changes broadcast by other collaborators; and those changes can be reflected in the user's version of the change list (e.g., by a reconciliation process) and represented in the user's current state tree.

The user-specific fork in the change list can be controllably shared by the user to the group and/or to a specific member of the group. When the user decides to allow the private content to be broadcast, reconciliation between the versions may be carried out. Through using the described data structures, it is possible to have granularity at a level of an entity (which is not required to be an independent unit) in the document. Advantageously, the forking in the change list (as represented by forked nodes in a current state tree) can be made at the level of an entity unit within the document. This granularity in separating public from private modifications to a document can reduce resource requirements, including, in some cases, storage requirements for copies and processing operations for merging changes.

As mentioned above, the private change can be stored in a version of the document created for the private mode and this private version of the document can be shared at the user's option and at a time of the user's choosing by reconciling the private version.

FIGS. 4A-4C, 5A-5C, 6A-6C, 7A-7C, 8A-8C, 9A-9E, 10A-10E, and 11A-11E illustrate a collaboration scenario including asynchronous collaboration in a synchronous collaboration environment. In the illustrated collaboration scenario, user/computing devices AB, WE, and CD are in a collaboration session.

Figure 4A:
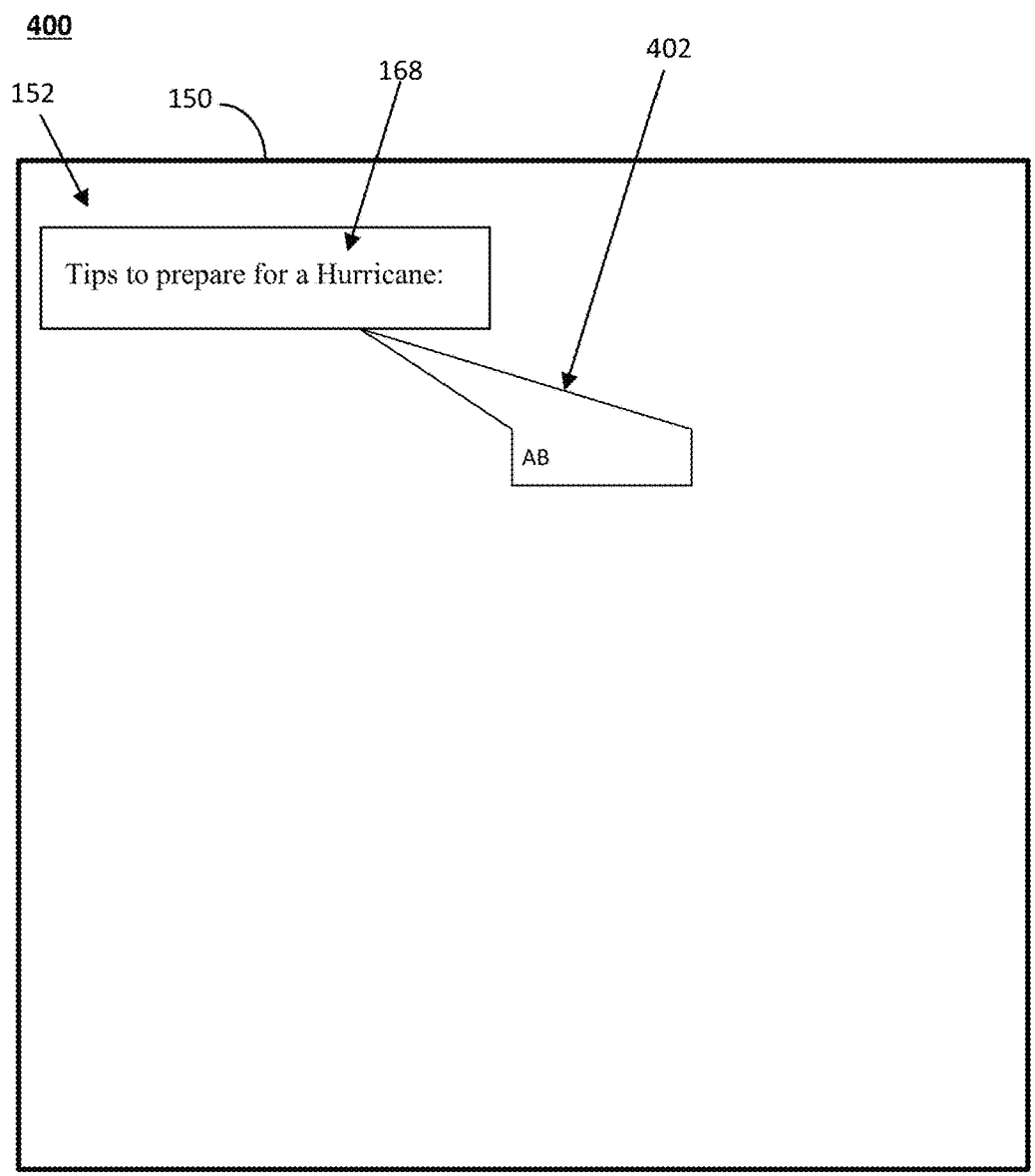
Figure 4B:
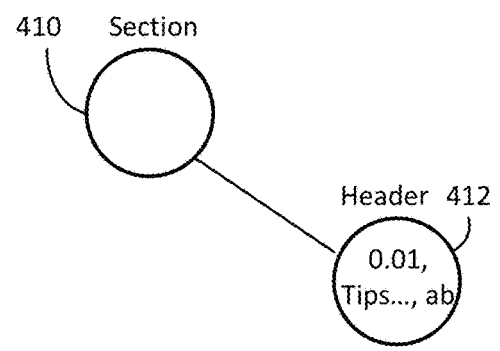
Figure 4C:
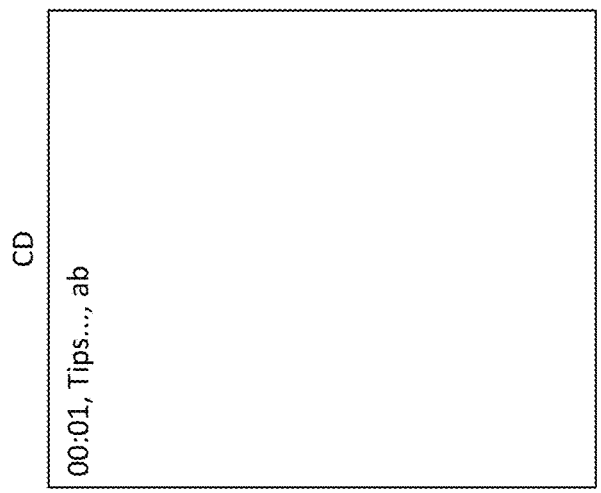
Figure 4C:
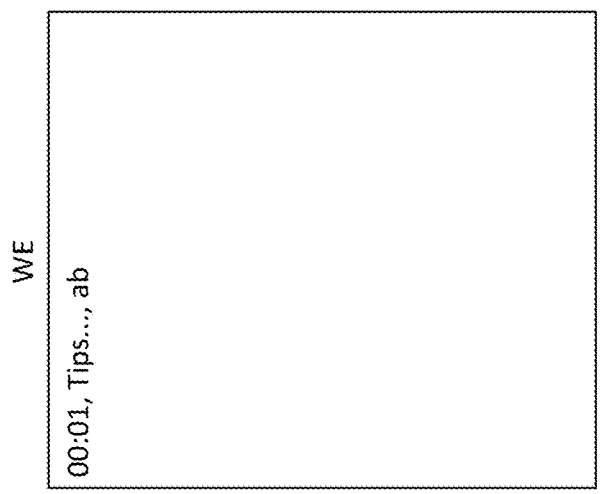
Figure 4C:
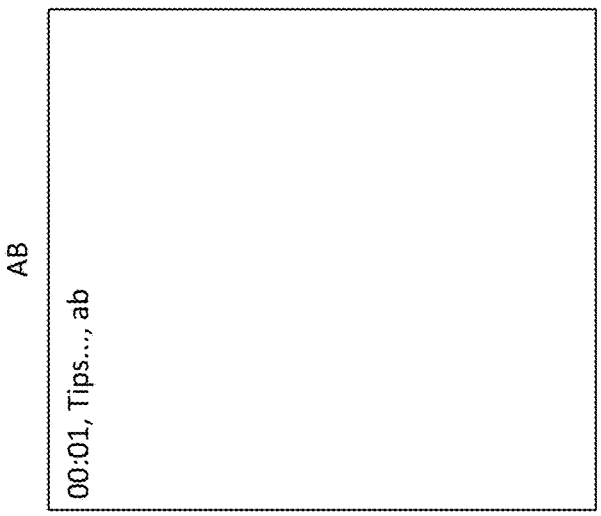

FIG. 4A shows the state 400 of the document 150 at a time 0.01. Here, user AB has added (402) content of the header 168 in section 152. FIG. 4B shows an example current state tree with section node 410 and header node 412. The nodes can include parameters such as, but not limited to, time, user/client identifier, and content. FIG. 4C shows the change list at each computing device, which in this synchronous collaboration environment shows all three change lists being the same since the changes made by AB are broadcast to the other participants.

Figure 5A:
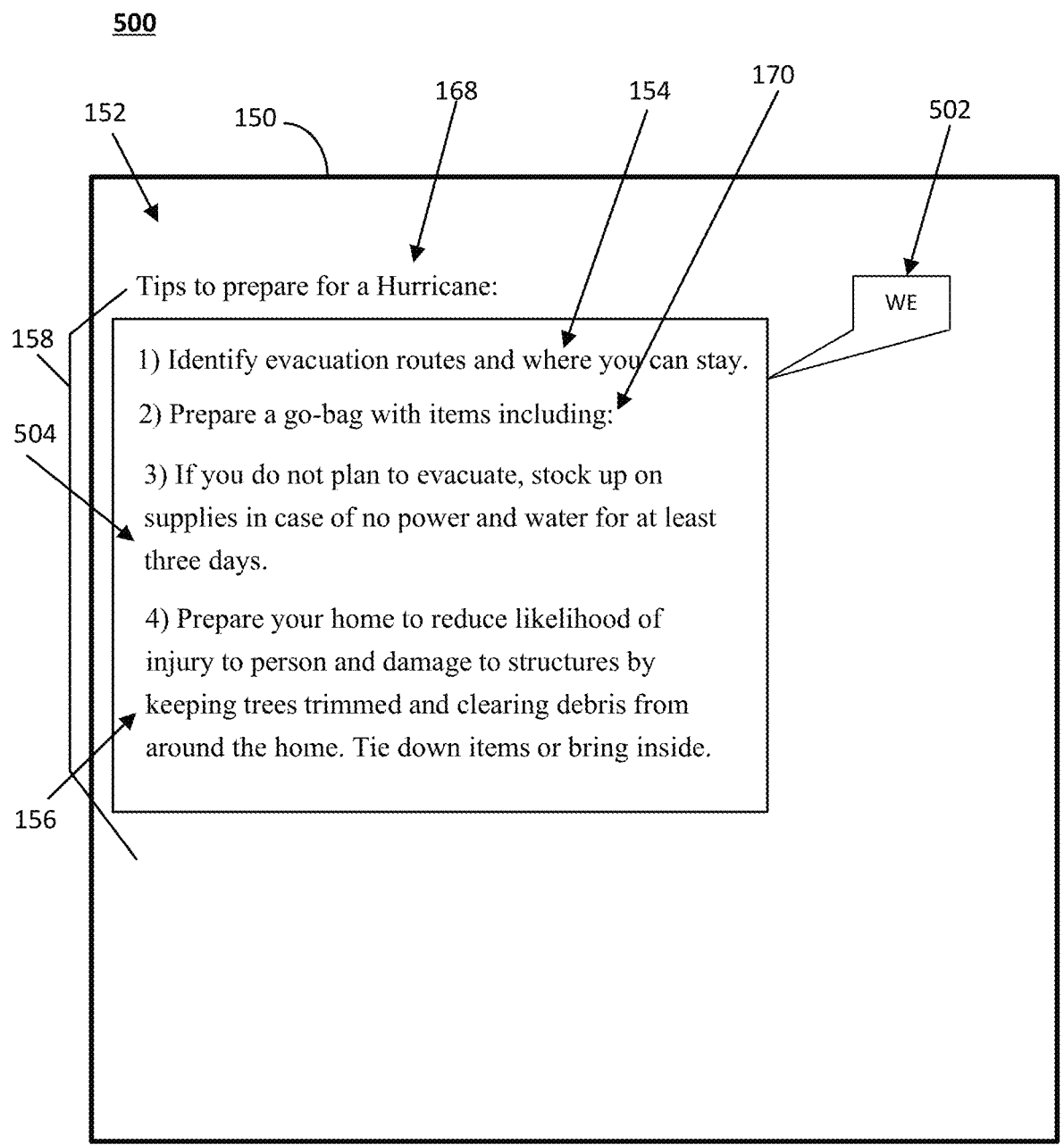
Figure 5B:
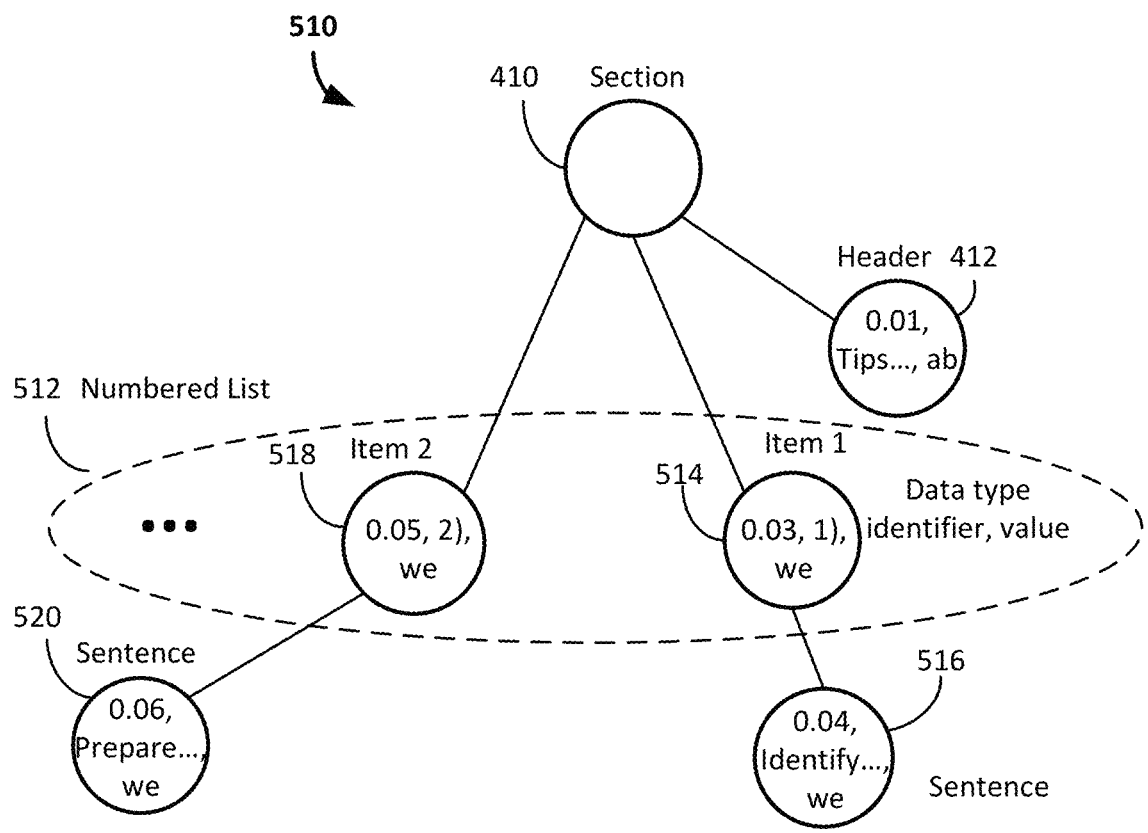

FIG. 5A shows the state 500 of the document 150 after a time 0.10. Here, user WE has added (502) content of the numbered list 158, sentence 154, sentence statement 170, sentence 504, and paragraph 156. FIG. 5B shows an example current state tree 510 with additional nodes representing the added content. Here, the current state tree includes section node 410, header node 412, and nodes sharing a common trait 512 of being part of a numbered list 158. Two of the four items of the numbered list 158 are shown in the figure. In particular, the first item is represented by node 514 and includes sentence 154, which may be represented by node 516. The second item is represented by node 518 and includes the sentence statement 170, which may be represented by node 520. FIG. 5C shows the change list at each computing device, which in this synchronous collaboration environment shows all three change lists being the same since the changes made by WE are broadcast to the other participants.

Figure 6A:
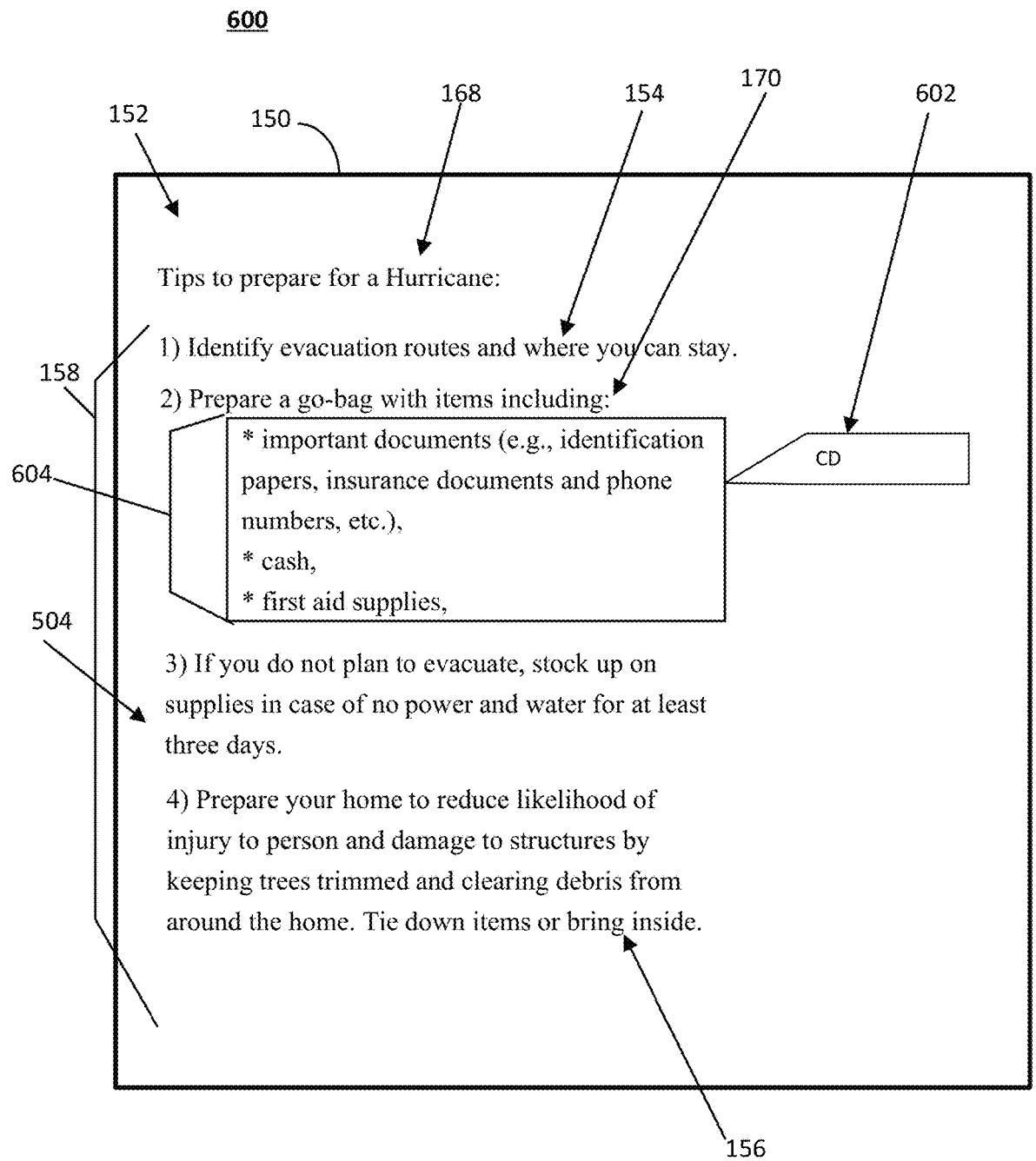
Figure 6B:
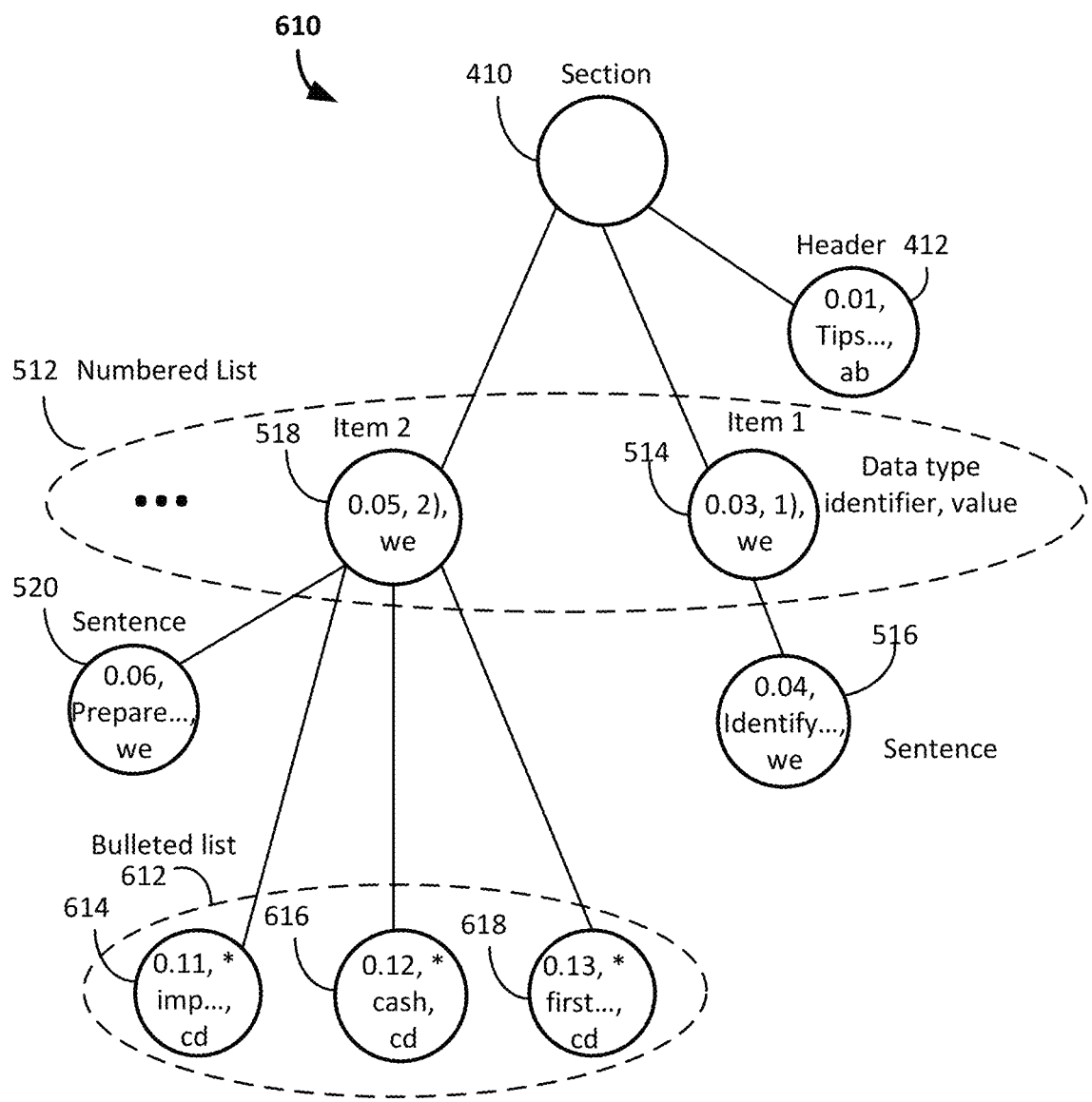

FIG. 6A shows the state 600 of the document 150 after a time 0.13. Here, user CD has added (602) content of three bulleted points 604. FIG. 6B shows an example current state tree 610 with additional nodes representing the added content. Here, the current state tree includes section node 410, header node 412, and nodes sharing a common trait 512 of being part of a numbered list 158. Two of the four items of the numbered list 158 are shown in the figure. In particular, the first item is represented by node 514 and includes sentence 154, which may be represented by node 516. The second item is represented by node 518 and includes the sentence statement 170, which may be represented by node 520. The additional content of the bulleted list 604 represented by the nodes sharing same trait 612 of being bullets. The three bullets added by CD are represented by nodes 614, 616, 618.

FIG. 6C shows the change list at each computing device, which in this synchronous collaboration environment shows all three change lists being the same since the changes made by CD are broadcast to the other participants.

Figure 7A:
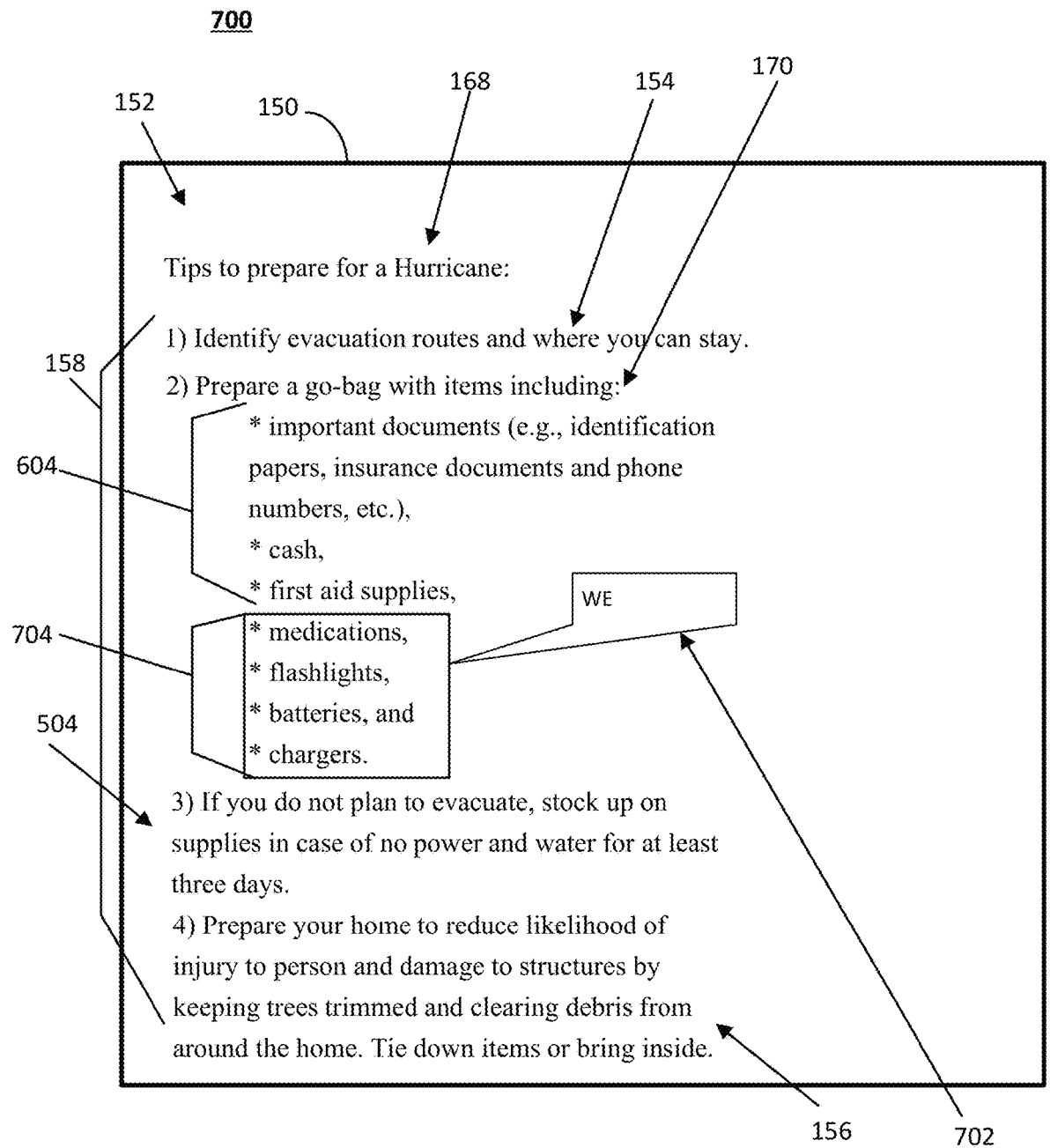
Figure 7B:
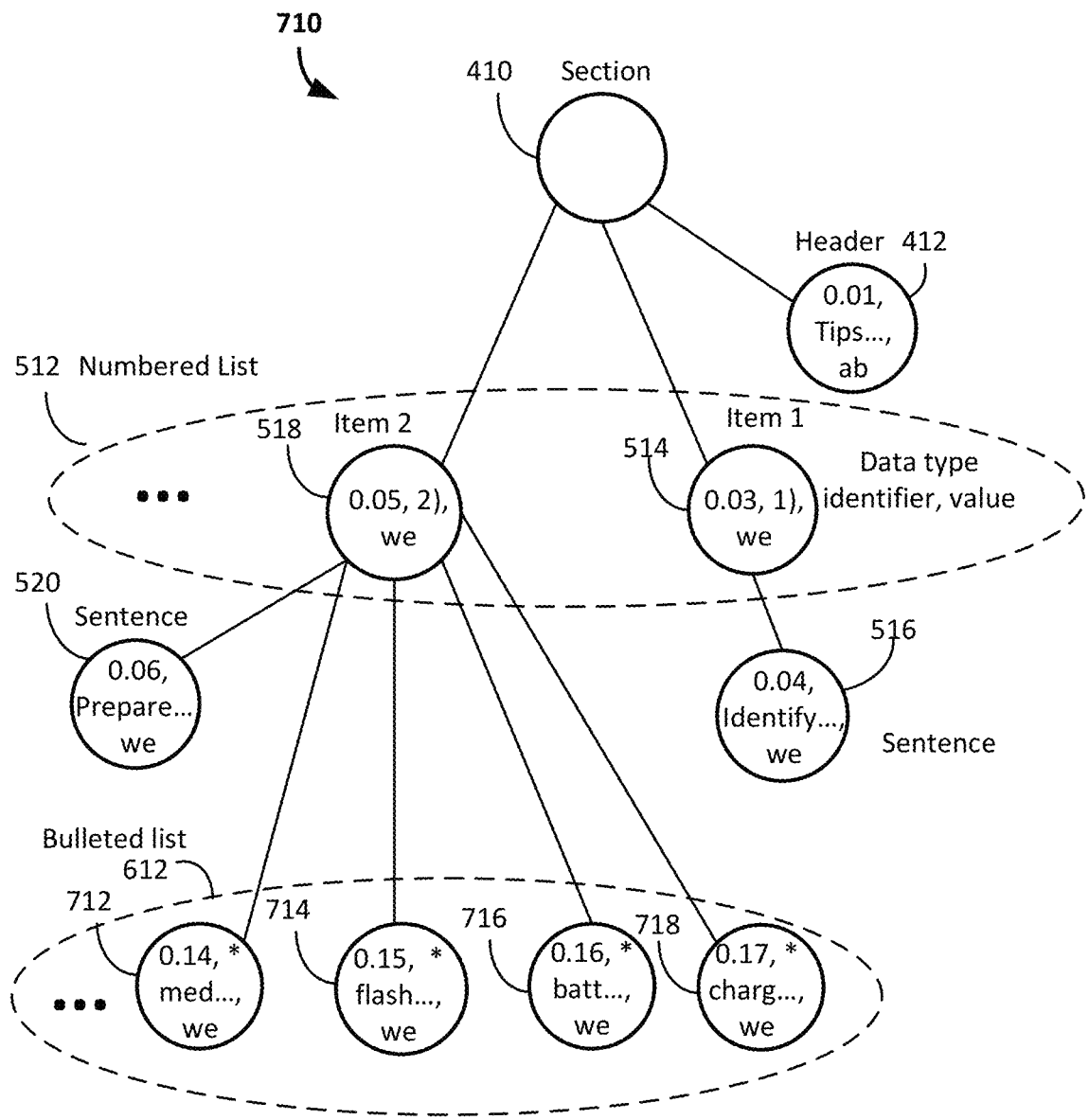

FIG. 7A shows the state 700 of the document 150 after a time 0.17. Here, user WE has added (702) content of four additional bulleted points 704. FIG. 7B shows an example current state tree 710 with additional nodes representing the added content. Here, the current state tree includes section node 410, header node 412, and nodes sharing a common trait 512 of being part of a numbered list 158. Two of the four items of the numbered list 158 are shown in the figure. In particular, the first item is represented by node 514 and includes sentence 154, which may be represented by node 516. The second item is represented by node 518 and includes the sentence statement 170, which may be represented by node 520. The bulleted list 604 and the additional bullets 704 added by WE are represented by the nodes sharing same trait 612 of being bullets. The four bullets added by WE are represented by nodes 712, 714, 716, and 718. The nodes 614, 616, 618 are not shown in the figure.

FIG. 7C shows the change list at each computing device, which in this synchronous collaboration environment shows all three change lists being the same since the changes made by WE are broadcast to the other participants.

Figure 8A:
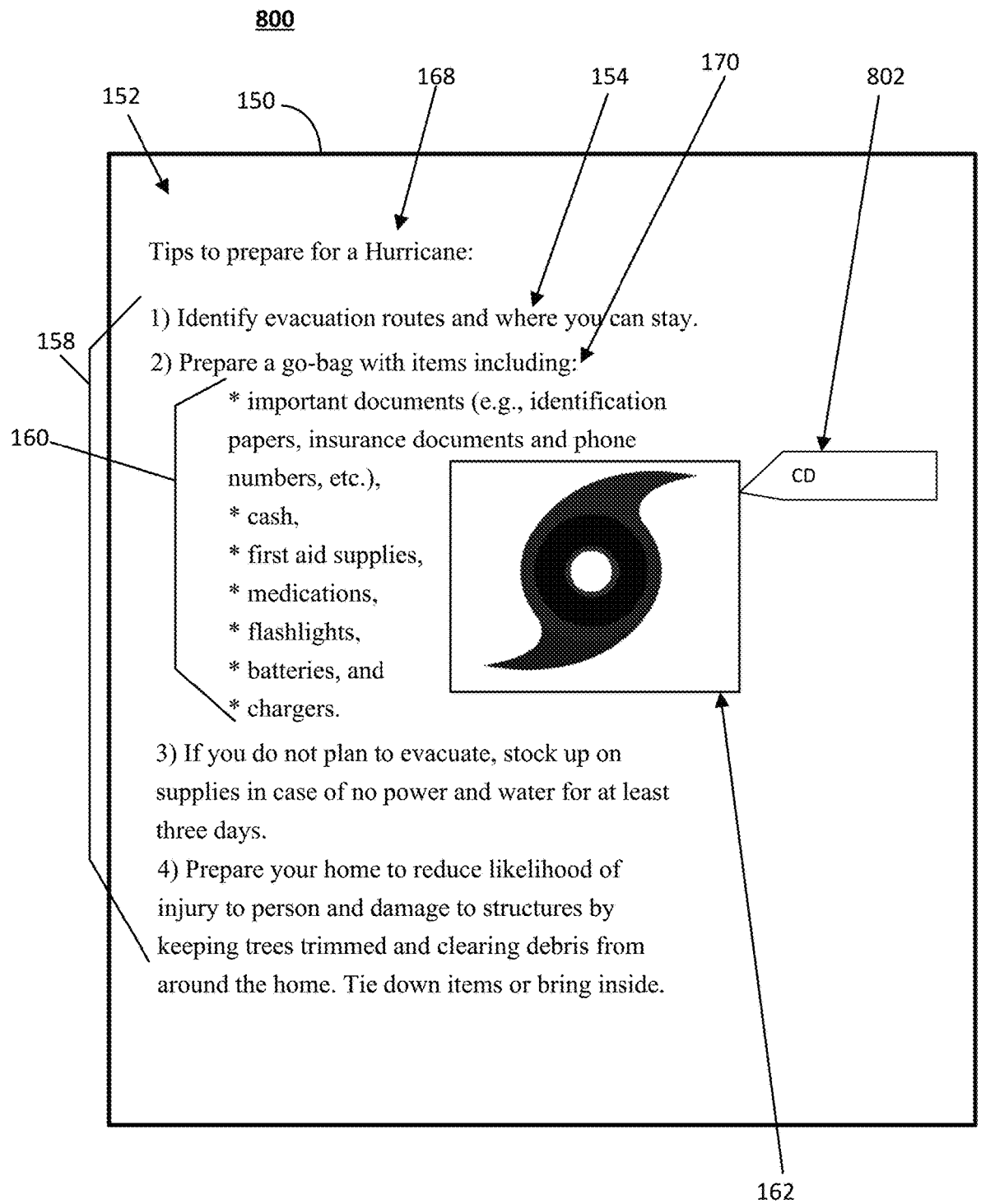
Figure 8B:
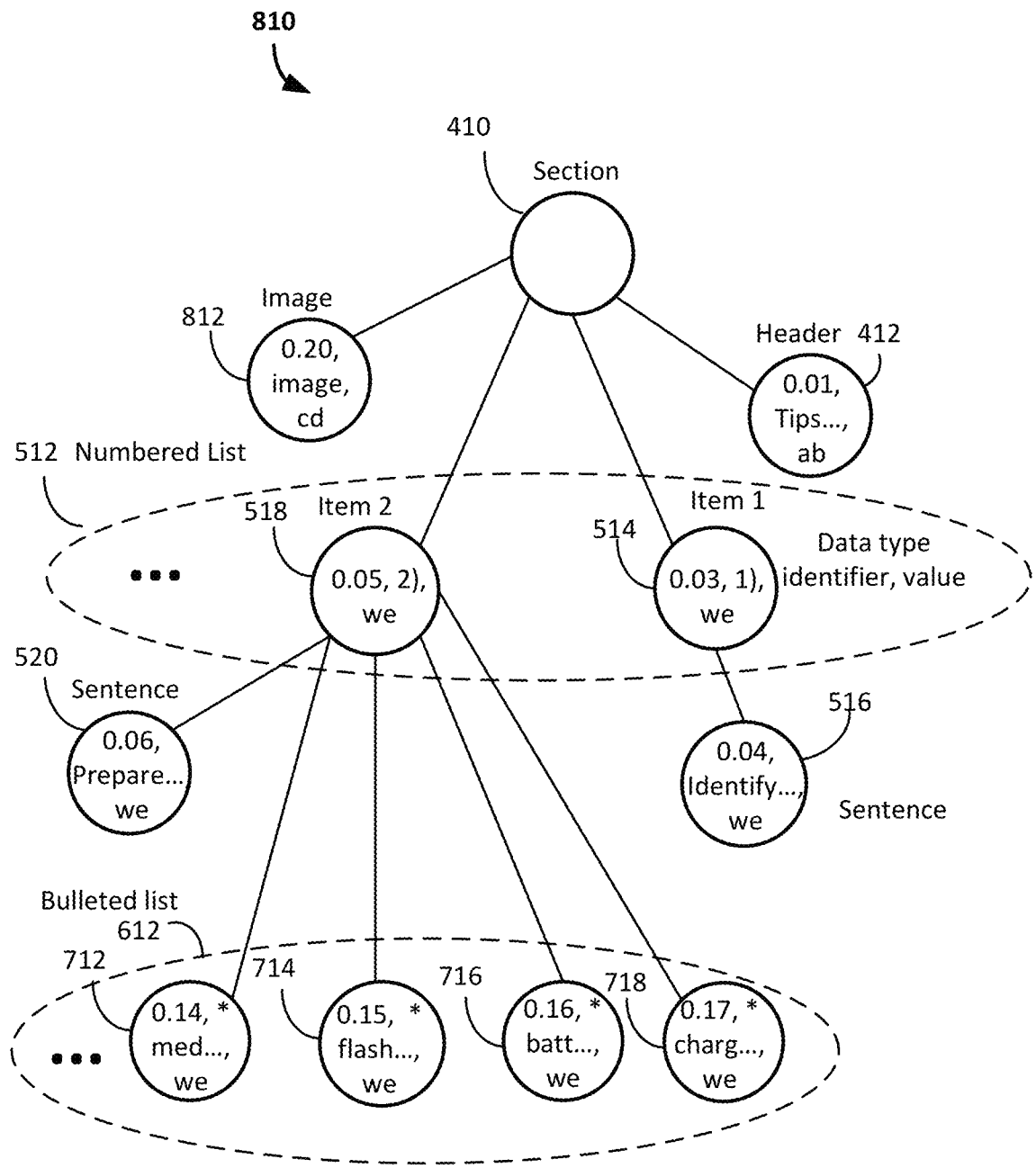

FIG. 8A shows the state 800 of the document 150 after a time 0.20. Here, user CD has added (802) content of the image 162. FIG. 8B shows an example current state tree 810 with the additional node 812 representing the added content of the image 162. FIG. 8C shows the change list at each computing device, which in this synchronous collaboration environment shows all three change lists being the same since the change made by CD is broadcast to the other participants.

Figure 9A:
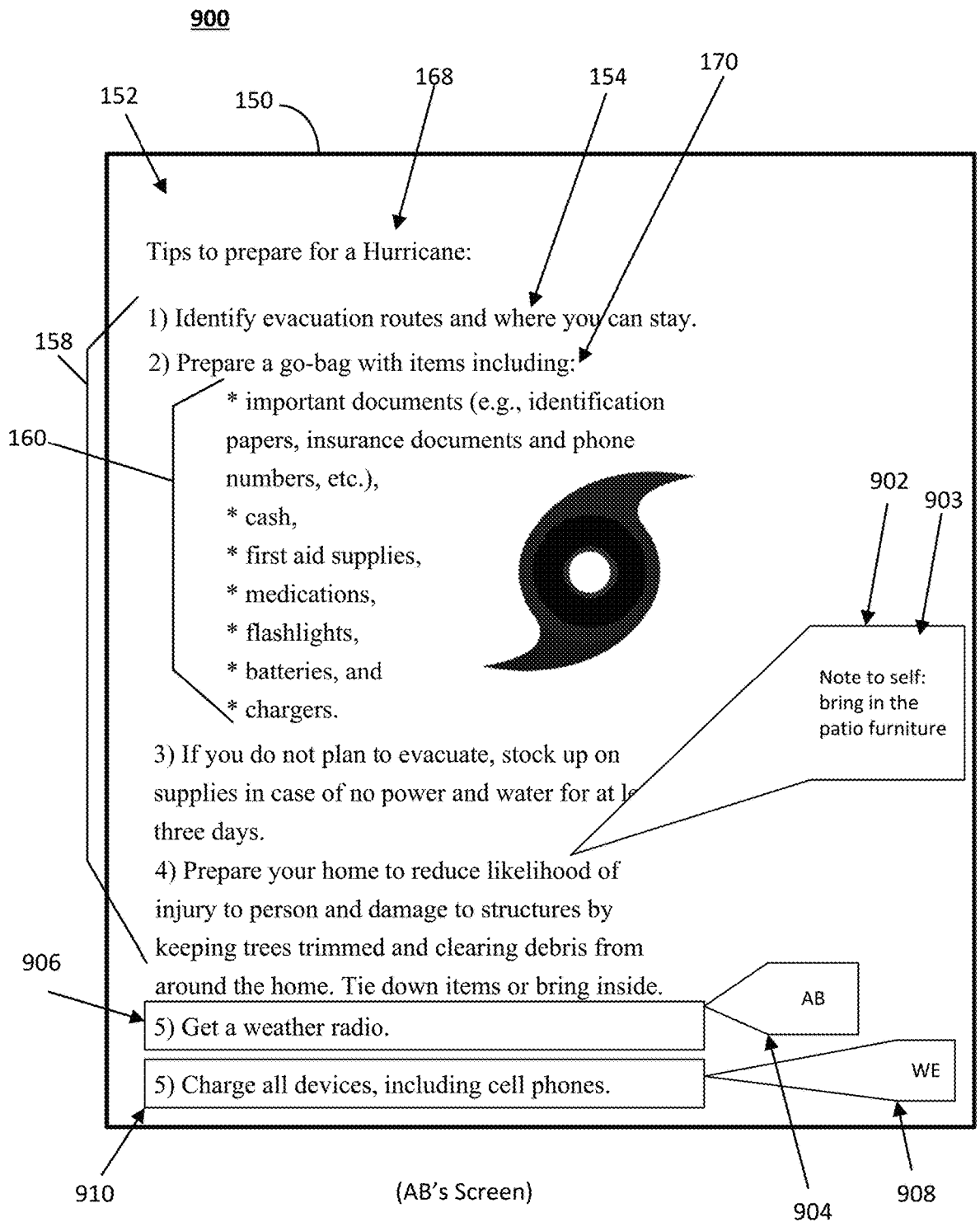
Figure 9B:
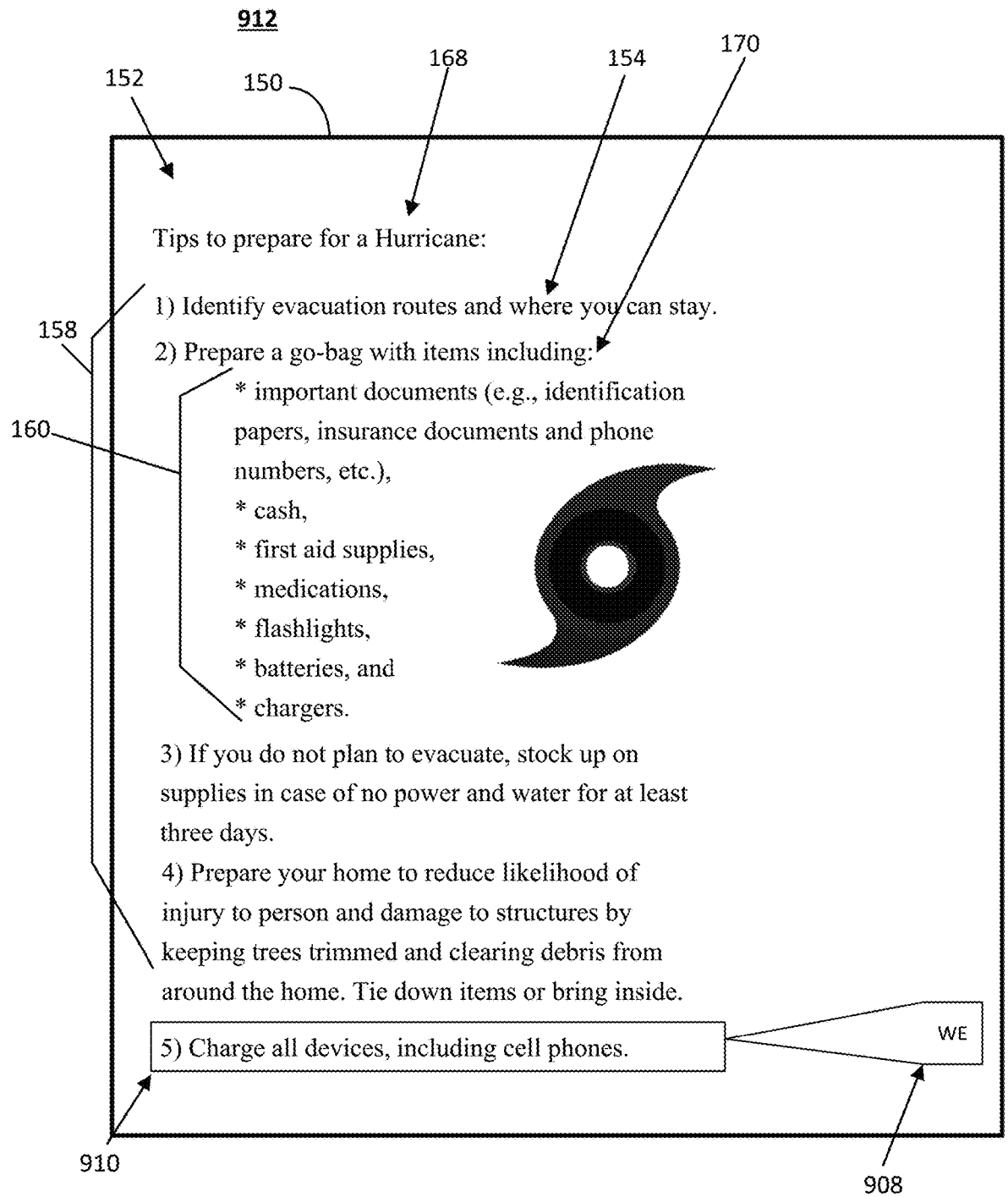

The remaining figures in the scenario illustrate the mute feature. AB may select to make a private change. This may be entered via a command or menu item (not shown). Referring to FIG. 9A, AB's display 900 shows AB's changes and any updates broadcast by the other participants (and received by AB's computing device). As shown in FIGS. 9B and 9E, in response to the indication to make the private change, a user-specific fork can be made in the current change list to contain private changes for the user AB. In addition, in the private/mute mode, the user AB is able to make private changes. Here, user AB added (902) a comment 903 and added (904) another item, item 5 906, in the numbered list. During the private mode for AB, the synchronous collaboration can continue such that changes made by others during the collaboration session can be continued into the private version for AB even though AB's private changes are not broadcast to the others. This is shown by the content 910 added (908) by WE, which is displayed at AB's display 900. However, WE and CD have a display 912 as shown in FIG. 9B because the broadcasting of AB's private changes are suppressed until the system receives an indication to broadcast the private change (and reconcile the differences), as illustrated in FIGS. 10A-10E and 11A-11E. The current state tree 920 for AB is shown in FIG. 9C and the current state tree 950 for WE and CD is shown in FIG. 9D.

Figure 9C:
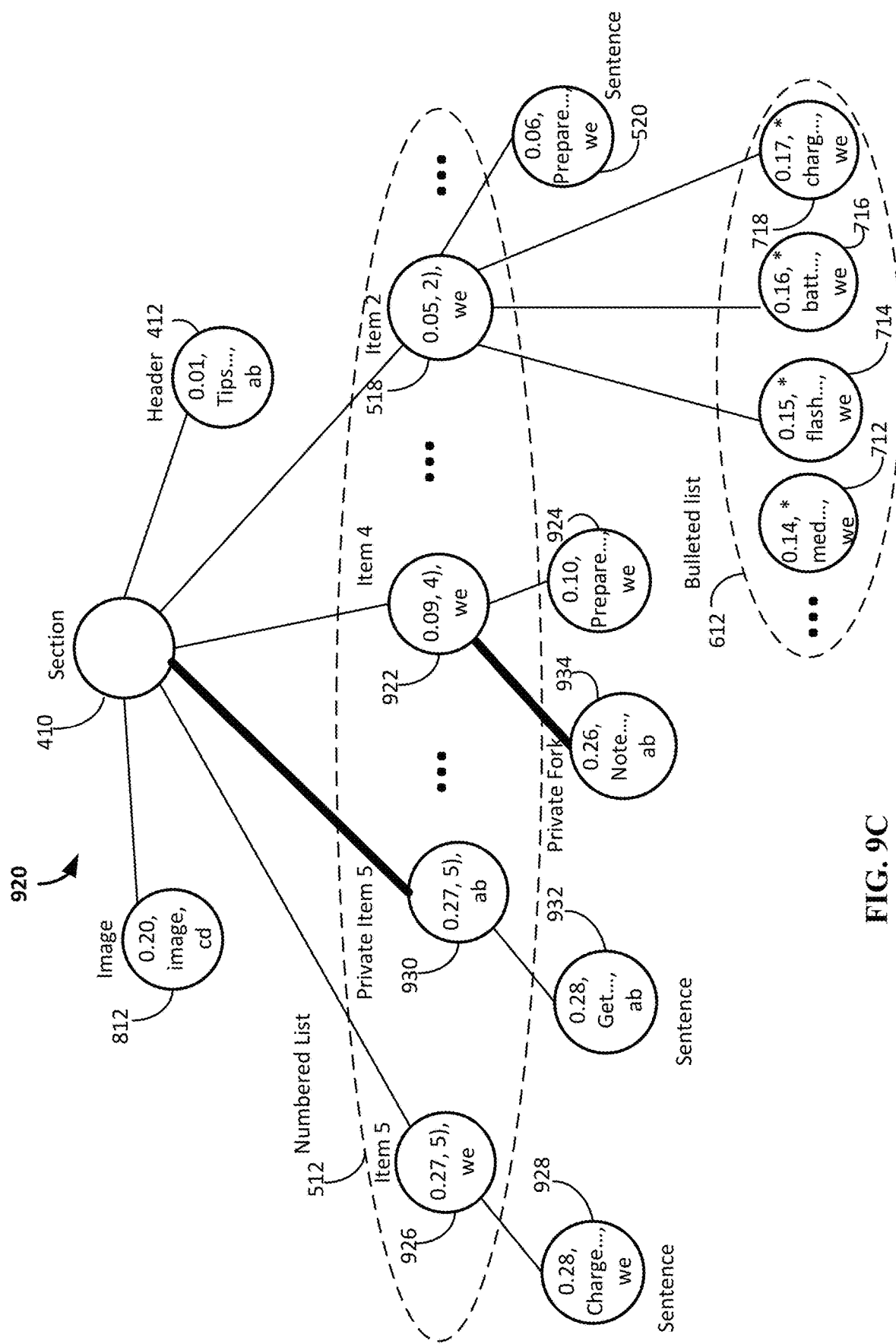
Figure 9D:
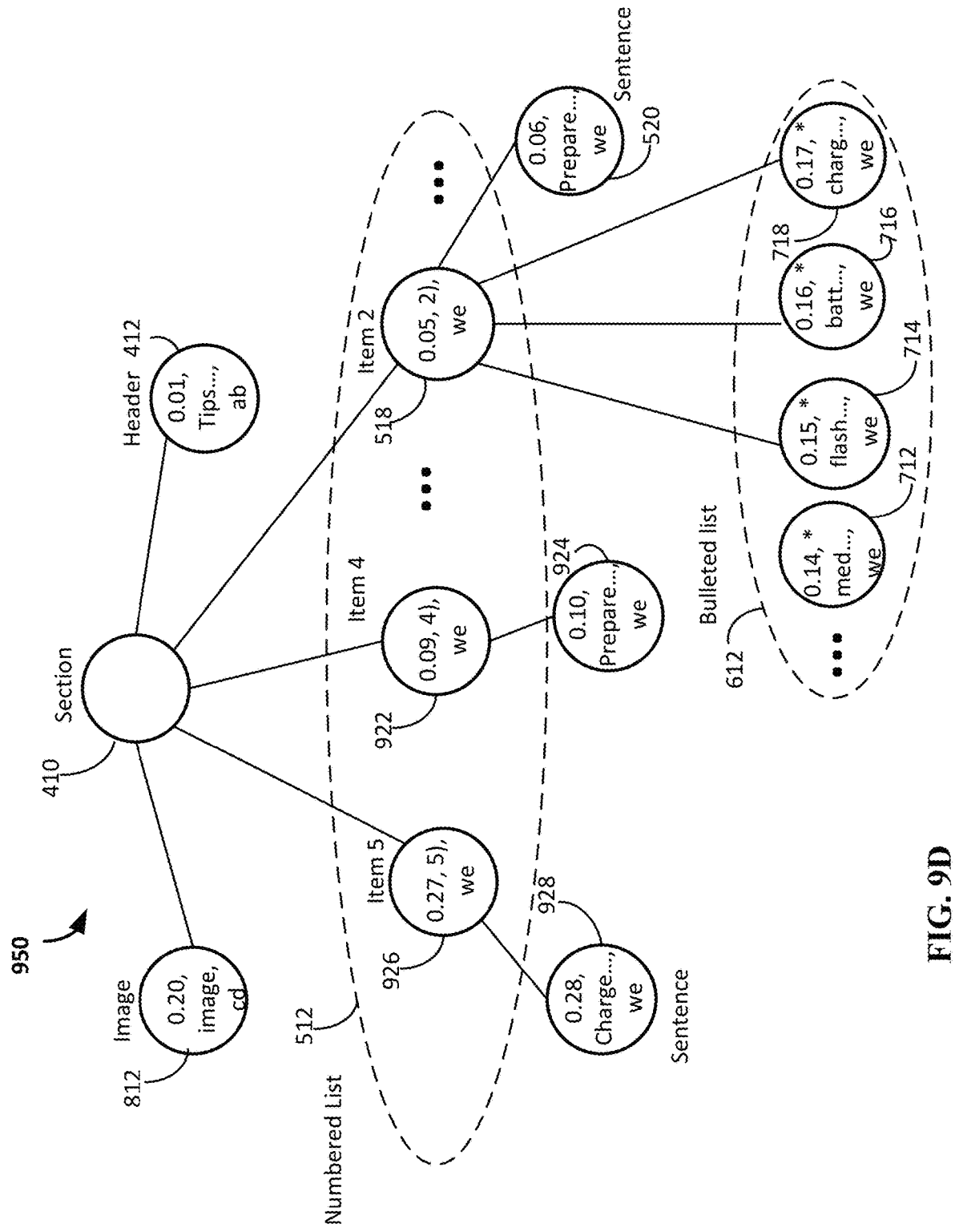
Figure 9E:
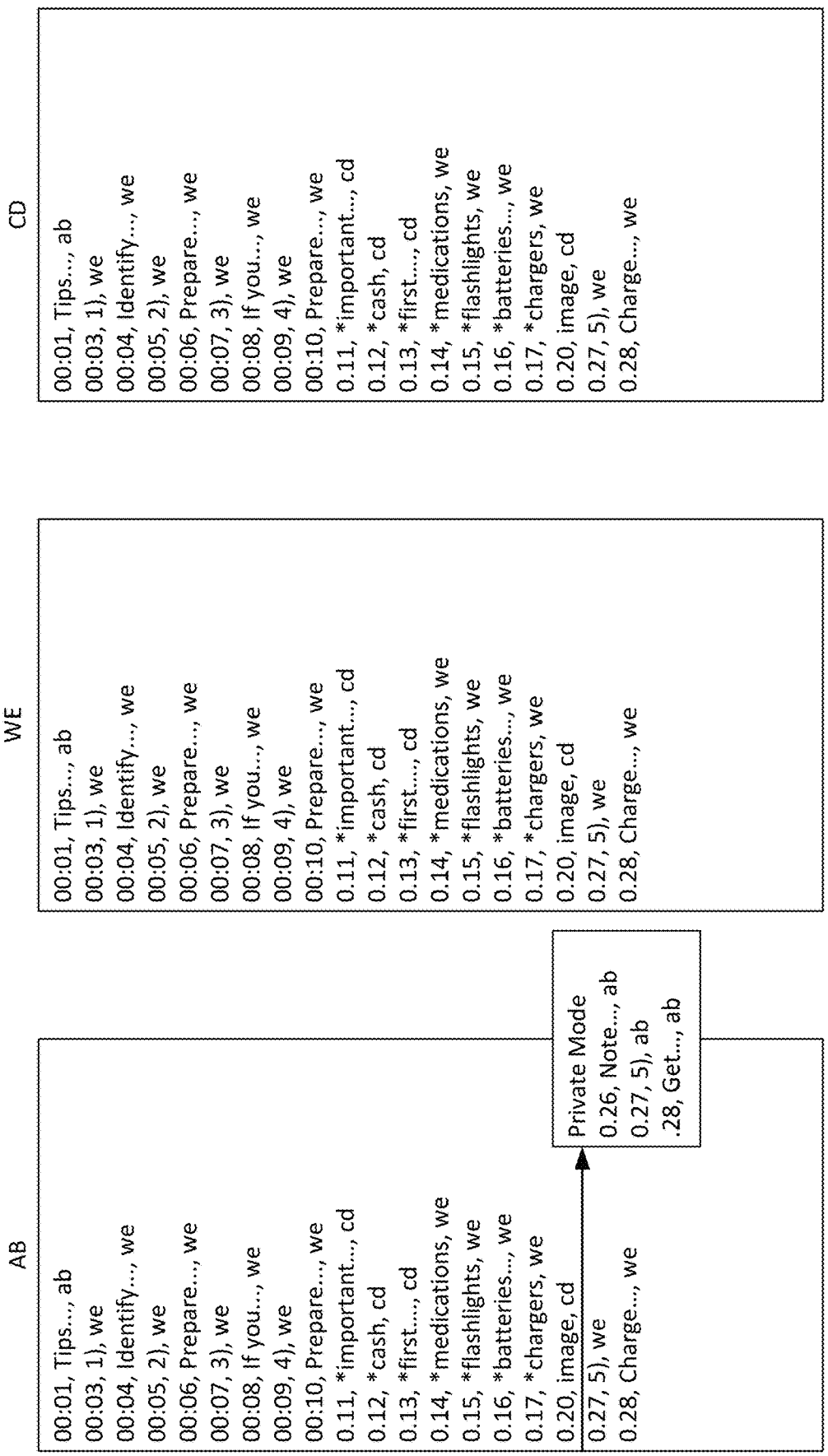

Referring to FIGS. 9C and 9D, the current state trees 920 and 950 both include section node 410, image 812, header node 412, and nodes sharing a common trait 512 of being part of a numbered list 158. Not all of the items of the numbered list 158 are shown in the figure, but would be part of the state tree. In the figure, the second item is represented by node 518 and includes the sentence statement 170, which may be represented by node 520, and the fourth item is represented by node 922 and includes the paragraph 156, which may be represented by node 924. Newly added content 910 from WE for item 5 is represented by node 926 with its sentence represented by node 928. Also included are the bulleted list 604 and its content represented by nodes 712, 714, 716, and 718. The nodes 614, 616, 618 are not shown in the figure.

In AB's current state tree 920, the private change content is reflected by the forks (e.g., forked nodes 930, 934 reflected in the user-specific forks in the change list shown in FIG. 9E). In the current state tree for AB, the private forks can include the new content (with node 934) and a copy of existing content (if item 5 was received first and AB is considered to be privately modifying that content) or new content (forked node 930).

The mechanism by which to provide the indication of private/mute mode can be any suitable means. Examples include, but are not limited to, selecting a menu command (via tool bar, contextual menu, or other graphical representation), an audio command, a gestural input (via touch, gaze, facial or body movement), or via a brain-computer interface.

Figure 10A:
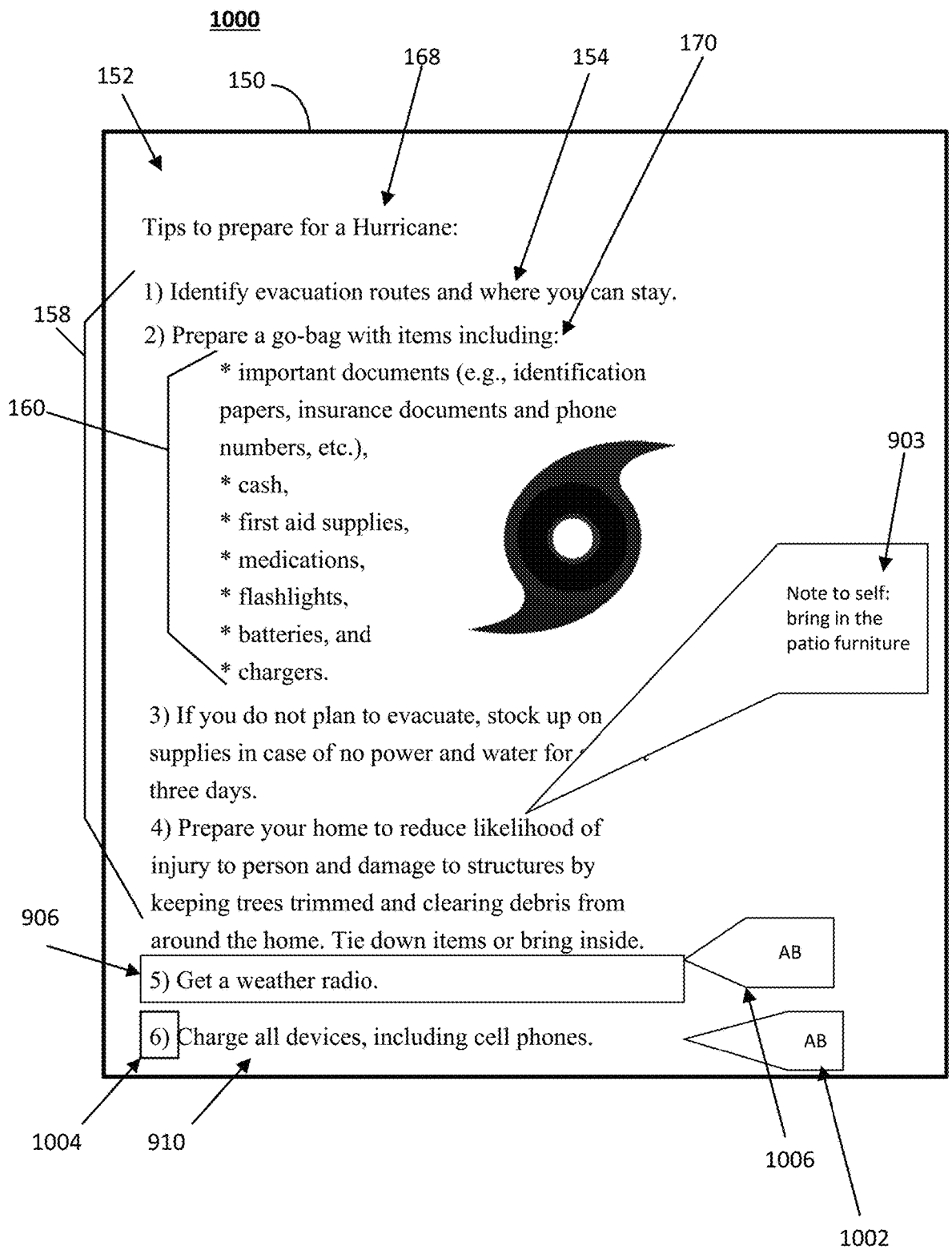
Figure 10B:
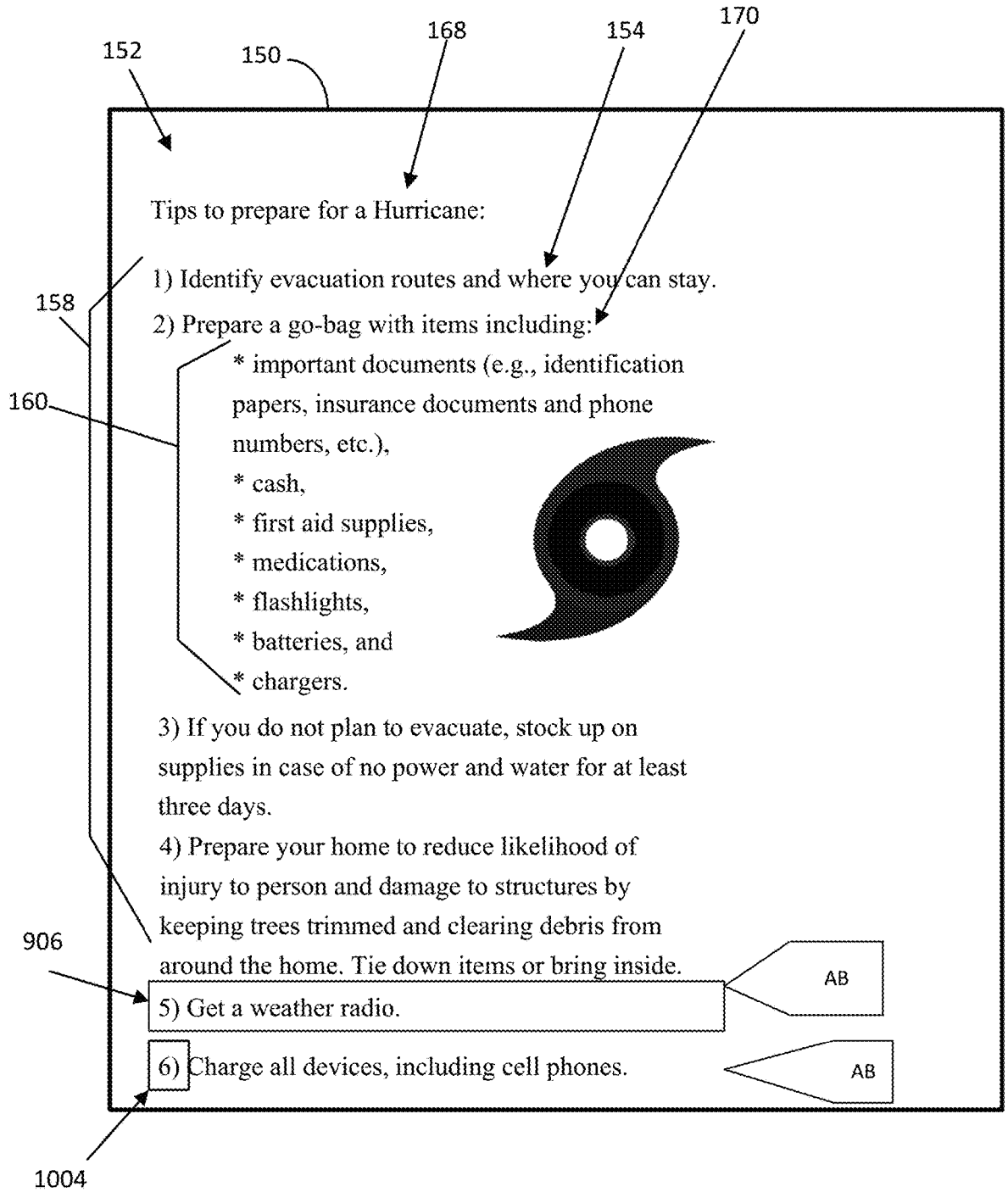

FIGS. 10A-10E illustrate the scenario where AB updates item 5 to say item 6 and releases the private item 5 for broadcasting. As shown in AB's view 1000 in FIG. 10A, user AB can update (1002) WE's previously added item 5 910 to indicate that it is item "6" 1004 and release (1006) their private change 906 to be broadcast to the other participants, who will see the view 1010 with content such as shown in FIG. 10B. AB's note 903 can be maintained as a private change. The selective broadcasting of private changes may be possible via any suitable means to indicate that a particular piece of content should remain private and/or can be broadcast.

Figure 10C:
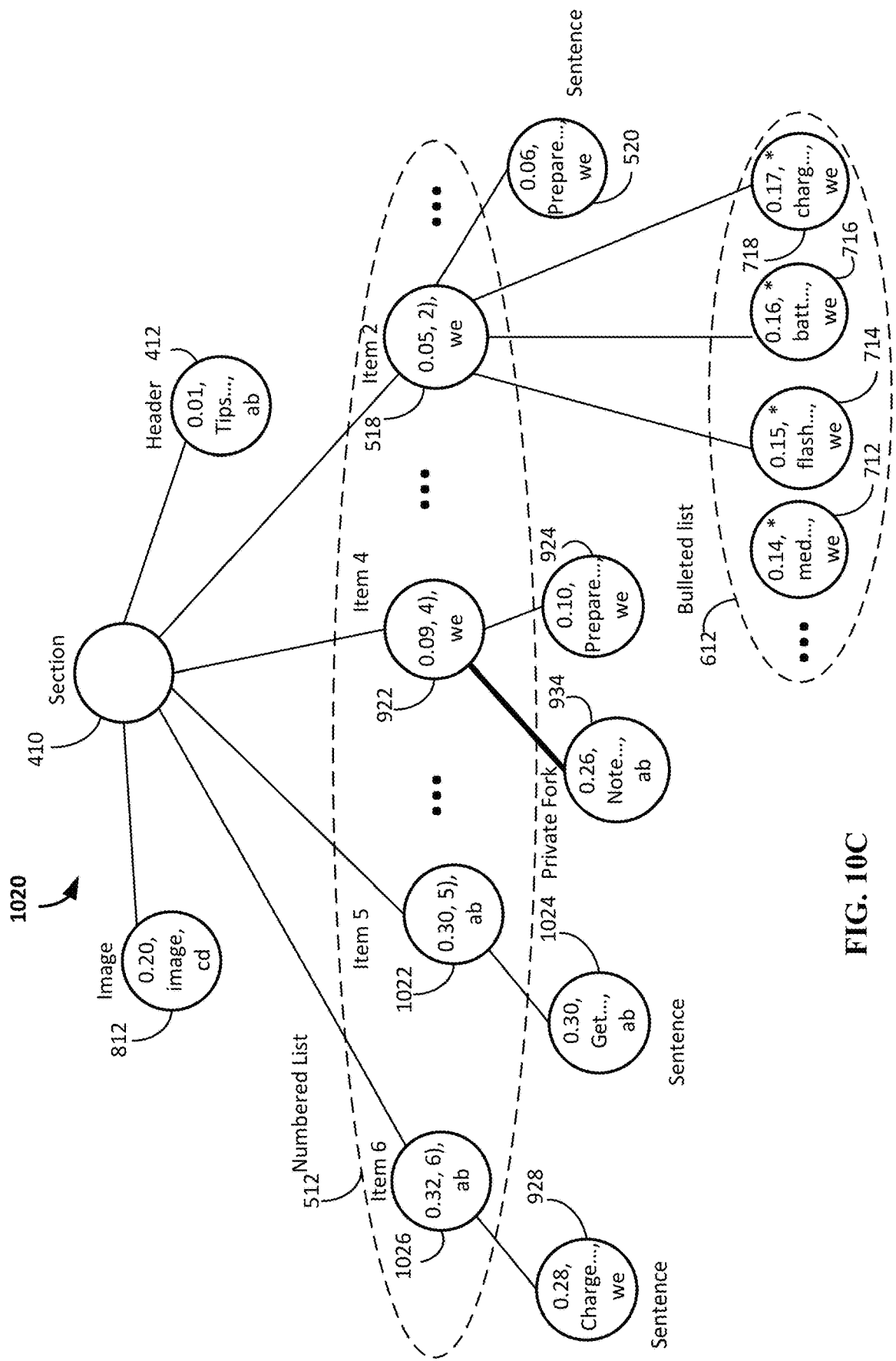
Figure 10D:
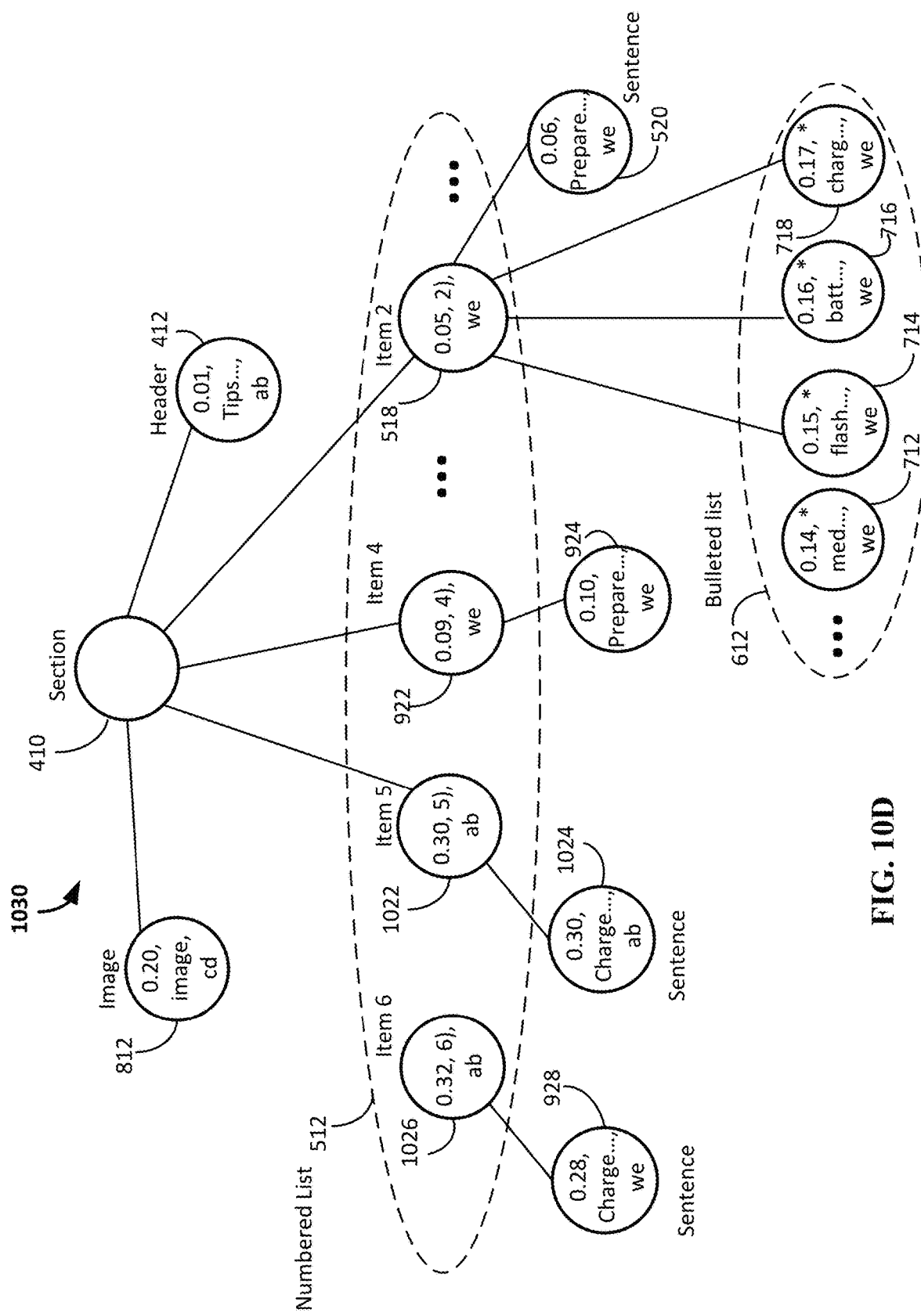

With the release of the content 906, as shown in FIG. 10C, AB's current state tree 1020 now shows only a single private fork, with node 934 for the private note 903. WE's and CD's current state tree 1030 is reflected in FIG. 10D. The newly broadcasted item 5 is represented as node 1022 with sentence represented as node 1024, and the previous sentence provided by WE (and represented by node 928) is now hanging from node 1026 for item 6. This reconciliation may be performed by merging (see e.g., discussion on copysets above). FIG. 10E shows the change list for each participant. In some cases, the previously private changes may still be tracked in the user-specific fork, but noted as released. In some cases, when a change is broadcast, the user-specific fork may remove the change. In both of these described cases, a copy of the private change is merged with the main change list. In the illustrated example, the private changes are tracked, and remain in the user-specific fork in the change list. In addition, a new time is indicated for the change in the main part of the list to reflect the broadcast time (which may also be the time that the private change is merged with the main change list).

FIGS. 11A-11E illustrate the scenario where AB releases the private comment to only WE. As mentioned above, it can be possible to selectively broadcast a participant's changes so that some changes may be maintained as private, while others are shared. In addition to this type of selective broadcasting of changes, it can be possible to selectively broadcast a change to a particular participant. The selective broadcasting of private changes to a particular participant may be possible via any suitable means to indicate that a particular piece of content is to be broadcast to fewer than all participants.

FIG. 11A shows an example view 1100 of the document for both AB and WE once AB selectively broadcasts private note 903 to WE; and FIG. 11B shows the view 1110 for WE.

Figure 11C:
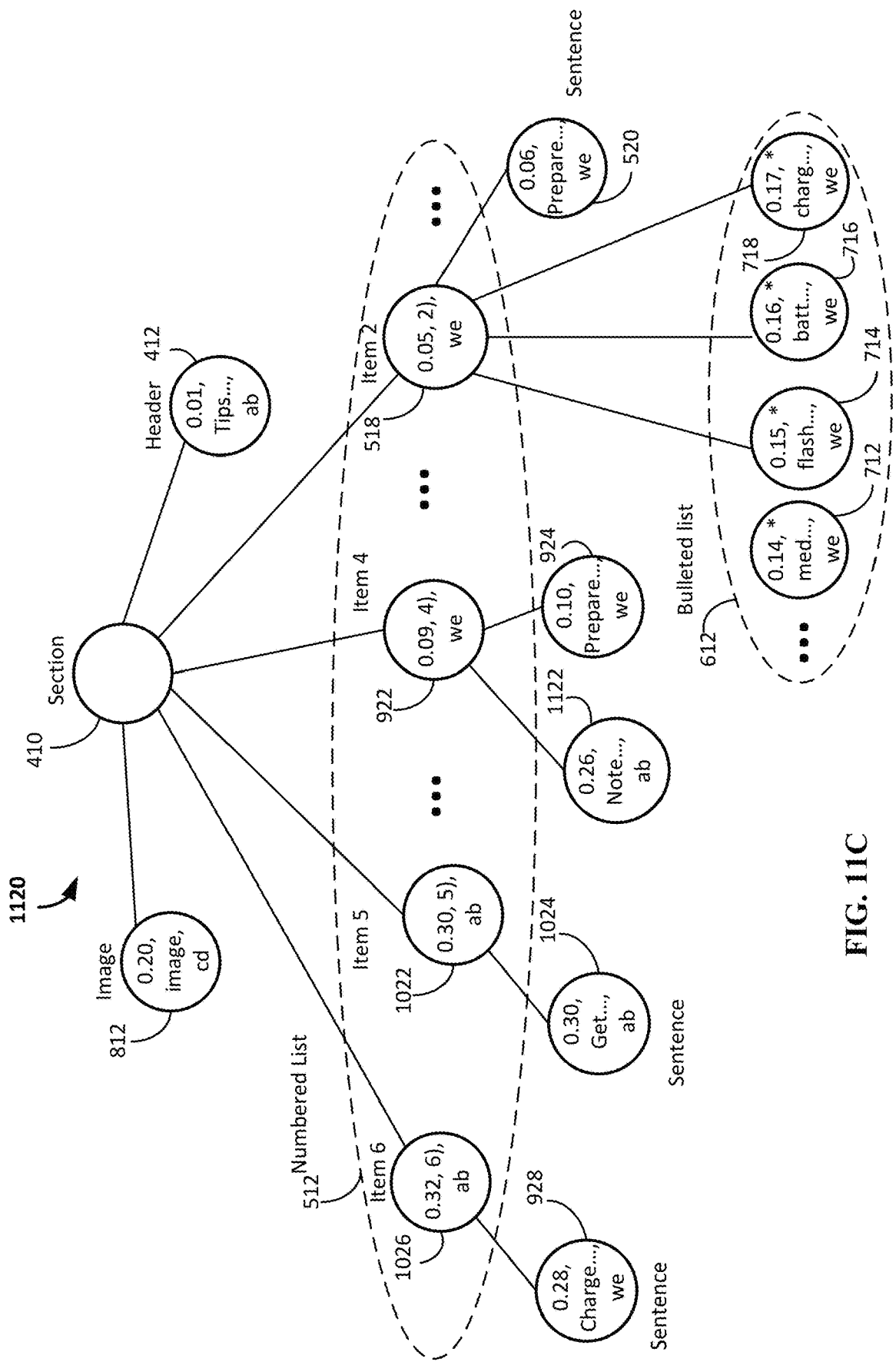

FIG. 11C may reflect both AB's and WE's current state tree 1120, which shows the note 903 represented as node 1122, which is not in a private fork. In some cases, since the content was not fully broadcast to all participants, the node 1122 may be a private fork in both of AB's and WE's current state tree (and similarly reflected in the change lists for AB and WE as being in their respective user-specific private forks).

Figure 11D:
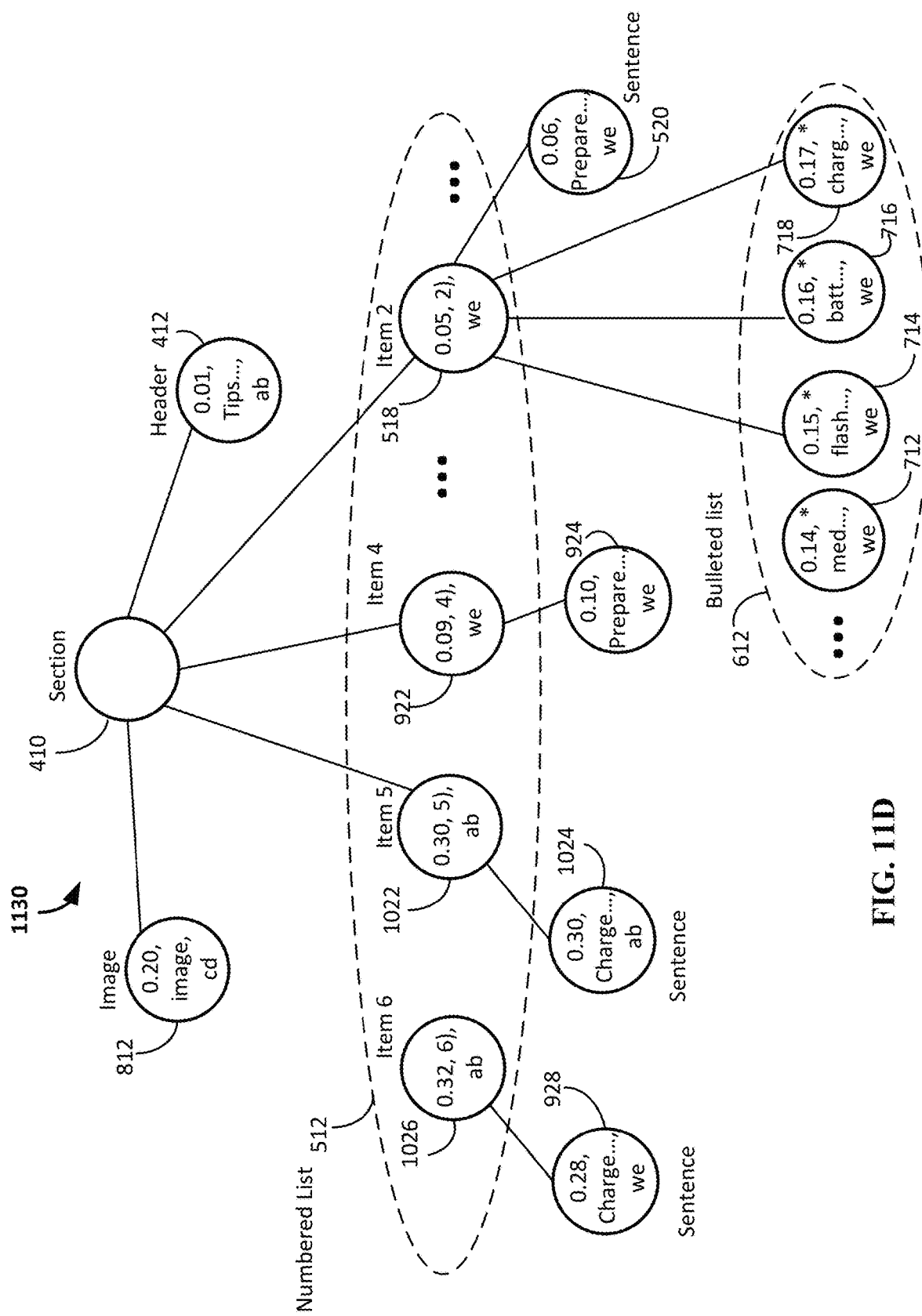

As shown in FIG. 11D, CD's current state tree 1130 can appear the same as the current state tree 1030 since CD does not receive the note from AB. FIG. 11E shows the change list for each participant. It can be seen that WE includes the note, but CD does not. In some cases, as mentioned above, the note (e.g., change to document for adding the note) may be included as part of WE's user-specific fork instead of, or in addition to, being listed as part of WE's public change list.

Conflict Representation and Resolution

The reconciliation is equivalent to a series of edits done on the document by two (or in the generalized case by more) cooperating polite agents representing the contributing copies. When agents notice a conflict, the later one will undo the action of the first, before making its change. These operations may be referred to as "conflict undo" and "conflict change" and the together the "conflict pair". At the end of reconciliation, the accepting copies will be all the same. Where there were conflicts, all the accepting copies can show the second person's version, but the conflicts will be noted in the histories as the "conflict undos".

The above described conflict representation and resolution may have been carried out in the scenario illustrated in FIGS. 10A-10E if AB had not made the change to the list item number 5 when releasing the private change that was also to list item number 5.

It is possible to individually address the conflicts and flip the conflict pairs as seen fit—or mark the conflicts as "resolved", although that need not prevent later flips, but will simply omit the highlighting of the conflict. Flipping a conflict pair means that the undo in the pair will be redone and the conflict change in the pair will be undone. In effect, the very general undo mechanism (as described above in the section entitled "Undo and Redo") can be used to represent conflicts.

Implementation Details for FM Groupware

FM groupware can be part of many experiences. It is possible to synchronize the state of a document on several platforms in real time. Synchronization is very useful whether a platform just displays information so that it can be seen by multiple users, or if the users can interact with the platform whether in a shared fashion or as a private device. A platform can simply be a display, or a beamer. In these cases, the synchronization is a practical substitute for the awkward hard-wired connection to the beamer or simply a matter of convenience where a user does not have to stand up, and walk up to the wall-mounted display but can still make a change visible to all. Complex multiple pane displays in public spaces could be controlled by synchronizing them from portable devices so that the displays themselves would not have to be touched.

Figure 12:
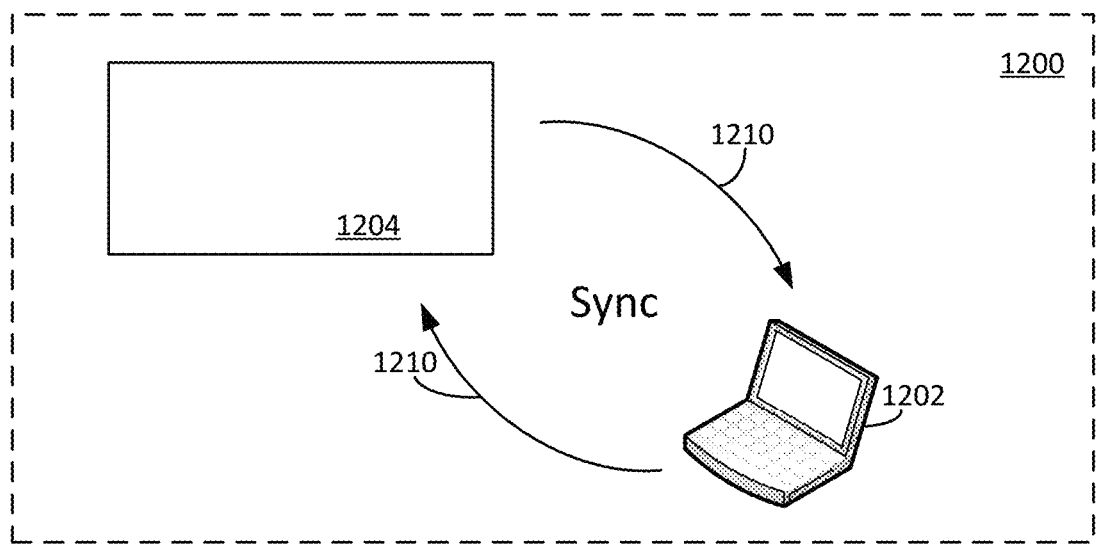
FIG. 12 illustrates an example collaboration environment.

FIG. 12 illustrates an example collaboration environment. In FIG. 12, the multiple platforms may be located in a same room 1200. For example, content modified at a laptop computer 1202 and a wall-mounted display 1204 in the same room 1200 can be synchronized 1210 using the described groupware features.

Figure 13:
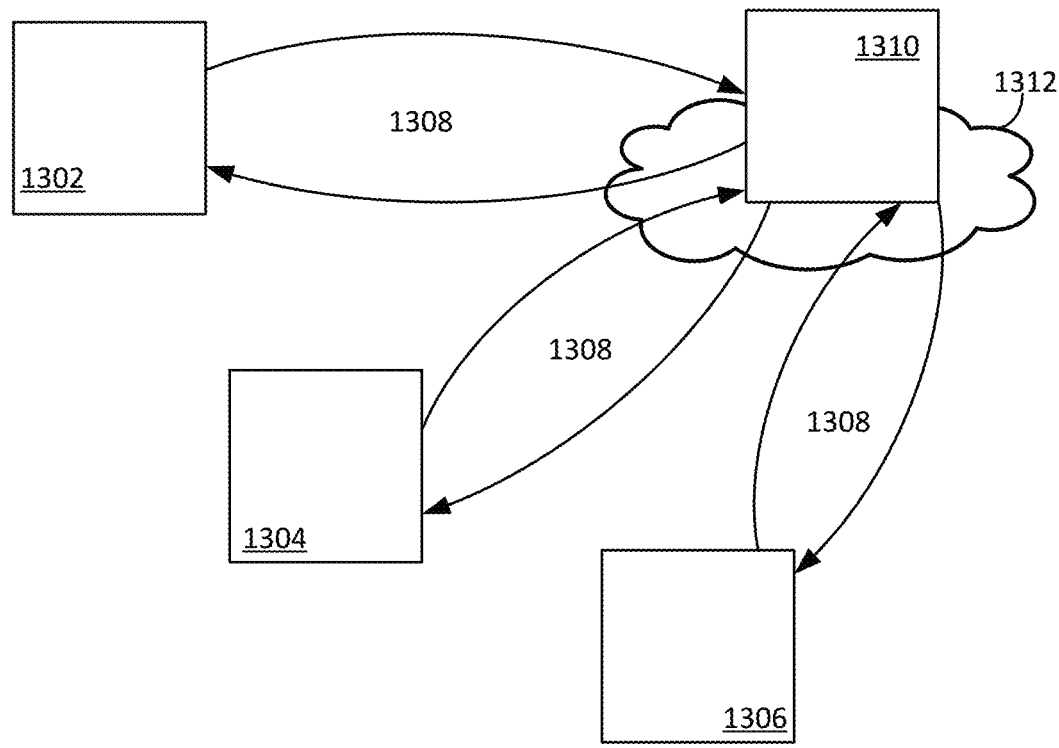
FIG. 13 illustrates another example collaboration environment.

FIG. 13 illustrates another example collaboration environment. For example, in yet another scenario, the platform with the synchronized copy is in the cloud, with the purpose to be backup for the results and also to provide a URL global address for the group that remote participants can connect with. In FIG. 13, clients (e.g., running on devices 1302, 1304, 1306) may be located in a same room or in different locations and can synchronize 1308 changes with a copy 1310 in the cloud 1312.

Figure 14:
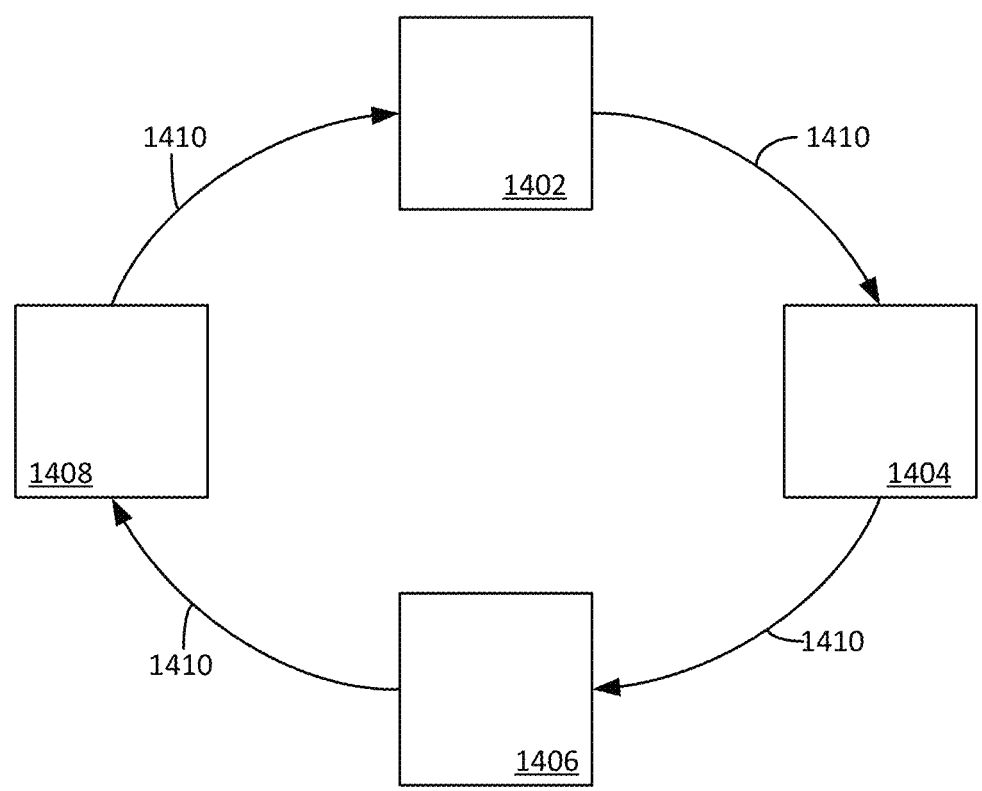
FIG. 14 illustrates yet another example collaboration environment.

FIG. 14 illustrates yet another example collaboration environment. Referring to FIG. 14, a peer-to-peer configuration may be utilized. For example, devices 1402, 1404, 1406, and 1408 can communicate with each other for synchronizing 1410 an interactive document. When there is no cloud server, the groupware can be considered to be operating in "line-of-sight" (LOS) mode. In LOS the participants can vouch for each other's identity because they can see the other persons or devices. Addressing is also much simplified: a filename-like word, or a system-supplied number will be sufficient, since the scope of this name is just the local net. This is very practical for "huddle" type impromptu meetings, or for the use of public displays or meeting rooms, including a coffee shop or an airport lounge.

For more complex "over-the-horizon" (OTH) operations, the issues of addressing and identity become more pronounced but still worthwhile given the value of remote synchronization. In this case, the address can be the net URL of the server.

The LOS/OTH duality is mirrored in the transport mechanism implementation. For LOS, the transport can operate on the local network p2p with very low latency and without any identification or service contract burden on the users. The downside is just that the communication is limited to local participants. For OTH, a natural implementation is to use a server in a star configuration among the participants. The server carries the address and handles identification and backup, if needed. The server can also provide continuity of FM synchronization even when some or all participants join, leave, and re-join in unpredictable patterns.

Figure 15:
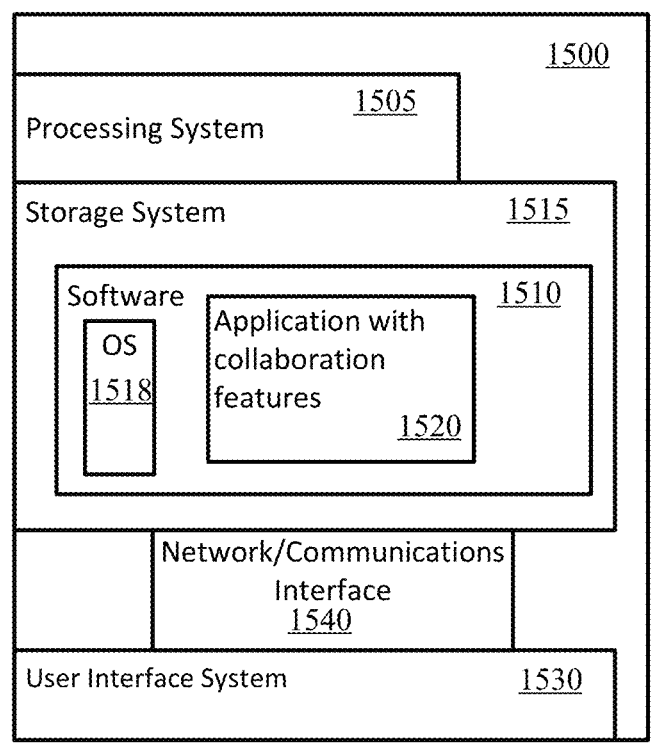
FIG. 15 illustrates representative components of a computing device that may be used to implement a groupware feature as described herein.

FIG. 15 illustrates representative components of a computing device that may be used to implement a groupware feature as described herein.

Referring to FIG. 15, system 1500 may represent a computing device such as, but not limited to, a personal computer, a reader, a mobile device, a personal digital assistant, a wearable computer, a smart phone, a tablet, a laptop computer (notebook or netbook), a gaming device or console, an entertainment device, a hybrid computer, a desktop computer, whiteboard, or a smart television. Accordingly, more or fewer elements described with respect to system 1500 may be incorporated to implement a particular computing device.

System 1500 includes a processing system 1505 of one or more hardware processors to transform or manipulate data according to the instructions of software 1510 stored on a storage system 1515. Examples of processors of the processing system 1505 include general purpose central processing units, application specific processors, and logic devices, as well as any other type of processing device, combinations, or variations thereof. The processing system 1505 may be, or is included in, a system-on-chip (SoC) along with one or more other components such as network connectivity components, sensors, video display components.

The software 1510 can include an operating system 1518 and application programs such as an application with collaboration features 1520 as described herein for asynchronous collaboration in a synchronous collaboration environment. Device operating systems generally control and coordinate the functions of the various components in the computing device, providing an easier way for applications to connect with lower level interfaces like the networking interface. Non-limiting examples of operating systems include WINDOWS from Microsoft Corp., APPLE iOS from Apple, Inc., ANDROID OS from Google, Inc., and the Ubuntu variety of the Linux OS from Canonical.

It should be noted that the operating system 1518 may be implemented both natively on the computing device and on software virtualization layers running atop the native device operating system (OS). Virtualized OS layers, while not depicted in FIG. 15, can be thought of as additional, nested groupings within the operating system space, each containing an OS, application programs, and APIs.

Storage system 1515 may comprise any computer readable storage media readable by the processing system 1505 and capable of storing software 1510 including the application with collaboration features 1520.

Storage system 1515 may include volatile and nonvolatile memory, removable and non-removable media implemented in any method or technology for storage of information, such as computer readable instructions, data structures, program modules, or other data. Examples of storage media of storage system 1515 include random access memory, read only memory, magnetic disks, optical disks, CDs, DVDs, flash memory, magnetic cassettes, magnetic tape, magnetic disk storage or other magnetic storage devices, or any other suitable storage media. In no case is the storage medium a transitory propagated signal or carrier wave.

Storage system 1515 may be implemented as a single storage device but may also be implemented across multiple storage devices or sub-systems co-located or distributed relative to each other. Storage system 1515 may include additional elements, such as a controller, capable of communicating with processing system 1505.

Software 1510 may be implemented in program instructions and among other functions may, when executed by system 1500 in general or processing system 1505 in particular, direct system 1500 or the one or more processors of processing system 1505 to operate as described herein.

The system can further include user interface system 1530, which may include input/output (I/O) devices and components that enable communication between a user and the system 1500. User interface system 1530 can include input devices such as a mouse, track pad, keyboard, a touch device for receiving a touch gesture from a user, a motion input device for detecting non-touch gestures and other motions by a user, a microphone for detecting speech, and other types of input devices and their associated processing elements capable of receiving user input.

A digitizing pen or a touch-based user input interface or other interface that can support inking may also be included as part of the user interface system 1530 in some implementations. A touch-based user input interface can include a touchscreen and/or surface with sensing components for a digitizer. In some cases, a digitizing pen may be used in place of or as part of a touch-based user input interface.

A natural user interface (NUI) may be included. Examples of NUI methods include those relying on speech recognition, touch and stylus recognition, gesture recognition both on screen and adjacent to the screen, air gestures, head and eye tracking, voice and speech, vision, touch, hover, gestures, and machine intelligence. Accordingly, the systems described herein may include touch sensitive displays, voice and speech recognition, intention and goal understanding, motion gesture detection using depth cameras (such as stereoscopic or time-of-flight camera systems, infrared camera systems, red-green-blue (RGB) camera systems and combinations of these), motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (EEG and related methods).

The user interface system 1530 may also include output devices such as display screen(s), speakers, haptic devices for tactile feedback, and other types of output devices. In certain cases, the input and output devices may be combined in a single device, such as a touchscreen display which both depicts images and receives touch gesture input from the user. A touchscreen (which may be associated with or form part of the display) is an input device configured to detect the presence and location of a touch. The touchscreen may be a resistive touchscreen, a capacitive touchscreen, a surface acoustic wave touchscreen, an infrared touchscreen, an optical imaging touchscreen, a dispersive signal touchscreen, an acoustic pulse recognition touchscreen, or may utilize any other touchscreen technology. In some embodiments, the touchscreen is incorporated on top of a display as a transparent layer to enable a user to use one or more touches to interact with objects or other information presented on the display.

Visual output may be depicted on the display (not shown) in myriad ways, presenting graphical user interface elements, text, images, video, notifications, virtual buttons, virtual keyboards, or any other type of information capable of being depicted in visual form.

The user interface system 1530 may also include user interface software and associated software (e.g., for graphics chips and input devices) executed by the OS 1518 in support of the various user input and output devices. The associated software assists the OS 1518 in communicating user interface hardware events to application programs using defined mechanisms. The user interface system 1530 including user interface software may support a graphical user interface, a natural user interface, or any other type of user interface. For example, a content creation/editing application with collaboration features 1520 described herein may be presented through user interface system 1530.

Network interface 1540 may include communications connections and devices that allow for communication with other computing systems over one or more communication networks (not shown). Examples of connections and devices that together allow for inter-system communication may include network interface cards, antennas, power amplifiers, RF circuitry, transceivers, and other communication circuitry. The connections and devices may communicate over communication media (such as metal, glass, air, or any other suitable communication media) to exchange communications with other computing systems or networks of systems. Transmissions to and from the communications interface are controlled by the OS 1518, which informs applications of communications events when necessary.

Certain techniques set forth herein with respect to the groupware/collaboration features may be described in the general context of computer-executable instructions, such as program modules, executed by one or more computing devices. Generally, program modules include routines, programs, objects, components, and data structures that perform particular tasks or implement particular abstract data types.

Alternatively, or in addition, the functionality, methods and processes described herein can be implemented, at least in part, by one or more hardware modules (or logic components). For example, the hardware modules can include, but are not limited to, application-specific integrated circuit (ASIC) chips, field programmable gate arrays (FPGAs), system-on-a-chip (SoC) systems, complex programmable logic devices (CPLDs) and other programmable logic devices now known or later developed. When the hardware modules are activated, the hardware modules perform the functionality, methods and processes included within the hardware modules.

Embodiments may be implemented as a computer process, a computing system, or as an article of manufacture, such as a computer program product or computer-readable medium. Certain methods and processes described herein can be embodied as software, code and/or data, which may be stored on one or more storage media. Certain embodiments of the invention contemplate the use of a machine in the form of a computer system within which a set of instructions, when executed, can cause the system to perform any one or more of the methodologies discussed above. Certain computer program products may be one or more computer-readable storage media readable by a computer system (and executable by a processing system) and encoding a computer program of instructions for executing a computer process. It should be understood that, as used herein, in no case do the terms "storage media", "computer-readable storage media" or "computer-readable storage medium" consist of transitory propagating signals.

It should be understood that the examples and embodiments described herein are for illustrative purposes only and that various modifications or changes in light thereof will be suggested to persons skilled in the art and are to be included within the spirit and purview of this application.

Although the subject matter has been described in language specific to structural features and/or acts, it is to be understood that the subject matter defined in the appended claims is not necessarily limited to the specific features or acts described above unless otherwise defined or disclaimed. Rather, the specific features and acts described above are disclosed as examples of implementing the claims and other equivalent features and acts are intended to be within the scope of the claims to the extent that such equivalent features are not inconsistent with subject matter explicitly defined or disclaimed.

What is claimed is:

1. A method comprising:
    displaying a document at a computing device, the document being stored with a change list and having a current state of content represented by a current state tree;
    receiving, at the computing device, a first change to the document from a user at the computing device; updating the change list with the first change, broadcasting the first change to synchronize a state of the document displayed at other computing devices, and displaying the document with the first change at the computing device;
    receiving, at the computing device, a second change to the document from another computing device; updating the change list with the second change, and displaying the document with the second change at the computing device;
    receiving, at the computing device, an indication to undo an operation, wherein the operation to be undone exists as a past entry in the change list and in response to the indication to undo the operation, updating the change list with an undo action entry that points to the past entry in the change list of the operation to be undone, wherein the undo action entry that points to the past entry in the change list of the operation to be undone is a new entry in the change list;
    receiving, at the computing device, an indication to make a private change; and, in response to the indication to make the private change, creating a user-specific fork in the change list to contain private changes for the user; and
    receiving, at the computing device, the private change from the user at the computing device; updating the change list in the user-specific fork with the private change; and suppressing the broadcasting of the private change until receiving an indication to broadcast the private change;
    if the indication to broadcast the private change is received, broadcasting the private change to synchronize the state of the document displayed at the other computing devices to include the private change.

2. The method of claim 1, wherein the user-specific fork represents an entire version of the document.

3. The method of claim 1, wherein the user-specific fork represents a subset of the document, wherein the subset of the document is less than an entire version of the document and comprises a copy of one or more entity units from the document.

4. The method of claim 1, wherein the second change comprises source information from the another computing device, the source information comprising a user identifier, a time, and a location of the second change with respect to other content in the document.

5. The method of claim 1, wherein the indication to broadcast the private change is received, wherein in response to receiving the indication to broadcast the private change, the method further comprises merging the user-specific fork in the change list with the change list.

6. One or more computer-readable storage media having instructions stored thereon that, when executed by a hardware processor, direct the hardware processor to:
    display a document at a computing device, the document being stored with a change list and having a current state of content represented by a current state tree;
    receive, at the computing device, a first change to the document from a user at the computing device; update the change list with the first change, broadcast the first change to synchronize a state of the document displayed at other computing devices, and display the document with the first change at the computing device;
    receive, at the computing device, a second change to the document from another computing device; update the change list with the second change, and display the document with the second change at the computing device;
    receive, at the computing device, an indication to undo an operation, wherein the operation to be undone exists as a past entry in the change list and in response to the indication to undo the operation, update the change list with an undo action entry that points to the past entry in the change list of the operation to be undone, wherein the undo action entry that points to the past entry in the change list of the operation to be undone is a new entry in the change list;
    receive, at the computing device, an indication to make a private change; and, in response to the indication to make the private change, create a user-specific fork in the change list to contain private changes for the user;
    receive, at the computing device, the private change from the user at the computing device; update the change list in the user-specific fork with the private change; and represent the private change in the current state tree;

receive, at the computing device, an indication to broadcast the private change to one or more selected participants of a synchronous collaboration environment; and broadcast the private change, including a location of the private change with respect to other content in the document, to synchronize the state of the document displayed at the other computing devices associated with the one or more selected participants or all the participants to include the private change.

7. The media of claim 6, wherein the user-specific fork represents an entire version of the document.

8. The media of claim 6, wherein the user-specific fork represents a subset of the document, wherein the subset of the document is less than an entire version of the document and comprises a copy of one or more entity units from the document.

9. The media of claim 6, wherein the second change comprises source information from the another computing device, the source information comprising a user identifier, a time, and a location of the second change with respect to other content in the document.

10. The media of claim 6, further comprising instructions that direct the hardware processor to:

merge the user-specific fork in the change list with the change list after the indication to broadcast the private change is received.

11. A computing device, comprising:

a display;

a hardware processor;

one or more computer-readable storage media having instructions stored thereon for asynchronous collaboration for a synchronous collaboration environment that, when executed by the hardware processor, direct the hardware processor to:

display a document, the document being stored with a change list and having a current state of content represented by a current state tree;

receive, via a user interface system of the computing device, a first change to the document from a user at the computing device; update the change list with the first change, broadcast the first change to synchronize a state of the document displayed at other computing devices, and display the document with the first change at the computing device;

receive a second change to the document from another computing device; update the change list with the second change, and display the document with the second change at the computing device;

receive, at the computing device, an indication to undo an operation, wherein the operation to be undone exists as a past entry in the change list and in response to the indication to undo the operation, update the change list with an undo action entry that points to the past entry in the change list of the operation to be undone, wherein the undo action entry that points to the past entry in the change list of the operation to be undone is a new entry in the change list;

receive, via the user interface system of the computing device, an indication to make a private change; and, in response to the indication to make the private change, create a user-specific fork in the change list to contain private changes for the user;

receive, via the user interface system of the computing device, the private change from the user at the computing device; update the change list in the user-specific fork with the private change; represent the private change in the current state tree; and display the private change in the document;

receive, at the computing device, an indication to broadcast the private change to all participants of a synchronous collaboration environment; and broadcast the private change, including a location of the private change with respect to other content in the document, to synchronize the state of the document displayed at the other computing devices associated with the participants to include the private change.

12. The computing device of claim 11, wherein the user-specific fork represents a subset of the document, wherein the subset of the document is less than an entire version of the document and comprises a copy of one or more entity units from the document.

13. The computing device of claim 11, wherein the second change comprises source information from the another computing device, the source information comprising a user identifier, a time, and a location of the second change with respect to other content in the document.

14. The computing device of claim 11, further comprising instructions that direct the hardware processor to:

receive, via the user interface system, an indication to redo the operation; and, in response to the indication to redo the operation, update the change list with a redo action entry that points to the undo action entry in the change list.

15. The computing device of claim 11, further comprising instructions that direct the hardware processor to:

merge the user-specific fork in the change list with the change list after an indication to broadcast the private change is received.

\* \* \* \* \*